(12) United States Patent
Mimatsu et al.

(10) Patent No.: US 8,006,063 B2
(45) Date of Patent: *Aug. 23, 2011

(54) MANAGEMENT METHOD AND A MANAGEMENT SYSTEM FOR VOLUME

(75) Inventors: Yasuyuki Mimatsu, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 12/564,162

(22) Filed: Sep. 22, 2009

(65) Prior Publication Data

US 2010/0011184 A1 Jan. 14, 2010

Related U.S. Application Data

(63) Continuation of application No. 11/905,889, filed on Oct. 5, 2007, now Pat. No. 7,610,467, which is a continuation of application No. 11/290,123, filed on Nov. 29, 2005, now Pat. No. 7,296,131, which is a continuation of application No. 10/894,983, filed on Jul. 19, 2004, now Pat. No. 7,010,660.

(30) Foreign Application Priority Data

May 20, 2004 (JP) ................................. 2004-150225

(51) Int. Cl.
*G06F 13/00* (2006.01)
*G06F 12/00* (2006.01)
(52) U.S. Cl. ............... 711/170; 710/104; 711/4; 711/5; 711/111; 711/112; 711/114
(58) Field of Classification Search .................. 711/112, 711/170, 4, 5, 111, 114; 710/104
See application file for complete search history.

(56) References Cited

U.S. PATENT DOCUMENTS

| 6,021,462 | A  | * | 2/2000 | Minow et al. ................ 711/114 |
| 6,061,768 | A  | * | 5/2000 | Kuo et al. ................... 711/156 |
| 6,898,670 | B2 |   | 5/2005 | Nahum |
| 7,103,712 | B2 |   | 9/2006 | Mizuno |
| 2003/0028731 | A1 |   | 2/2003 | Spiers et al. |

(Continued)

FOREIGN PATENT DOCUMENTS

| EP | 1357465 | 10/2003 |
| JP | 2001216240 A | 8/2001 |
| JP | 2003108412 A | 4/2003 |

OTHER PUBLICATIONS

Japanese Office Action, dated Jan. 5, 2010, issued in corresponding Japanese Patent Application No. 2004-150225 with English language translation.

(Continued)

*Primary Examiner* — Kevin L Ellis
*Assistant Examiner* — Mehdi Namazi
(74) *Attorney, Agent, or Firm* — Brundidge & Stanger, P.C.

(57) ABSTRACT

It is made possible to update information registered in a database of iSNS, SLP and the like in response to a configurational change in a storage device, and for a host computer to discover a disk volume. In response to changes in contents of operation to alter a storage configuration such as in creating or deleting a volume or LUN, contents of the alteration are reflected in the database of iSNS or SLP. Also, in response to a change in setting of LUN masking, a discovery domain of iSNS or attribute values of SLP are updated so that the host computer can discover the disk volume. Also, objects and services are reregistered periodically according to a registration period of iSNS or lifetime of SLP to prevent registered contents from expiring.

6 Claims, 41 Drawing Sheets

U.S. PATENT DOCUMENTS

| | | |
|---|---|---|
| 2003/0065760 A1 | 4/2003 | Casper et al. |
| 2003/0065902 A1 | 4/2003 | Shiga et al. |
| 2003/0070043 A1 | 4/2003 | Merkey |
| 2003/0110351 A1 | 6/2003 | Blood et al. |
| 2003/0131207 A1 | 7/2003 | Arakawa et al. |
| 2003/0177330 A1 | 9/2003 | Idei et al. |
| 2003/0229689 A1 | 12/2003 | Raghavan et al. |
| 2004/0024964 A1 | 2/2004 | Taninaka et al. |
| 2004/0117546 A1 | 6/2004 | Mizuno |
| 2004/0250007 A1 | 12/2004 | Nagasuka et al. |
| 2005/0114693 A1 | 5/2005 | Mimatsu et al. |
| 2005/0198224 A1 | 9/2005 | Kobayashi et al. |

OTHER PUBLICATIONS

Yasumori, Takizawa (2002) Technology scope, Nikkei Communications, Japan, Nikkei Business Publications, Inc., No. 361, p. 113, cited and discussed in Japanese Office Action listed above.

Gibbons, Kevin et al, "iSNS Internet Storage Name Service", Draft Internet Engineering Task Force, IETF, vol. ips, Jan. 1, 2001, 43 pages.

Bakke, Mark et al, "Finding iSCSI Targets and Name Servers Using SLP", Draft Internet Engineering Task Force, IETF, vol. ips, Apr. 1, 2001, 17 pages.

Satran et al., "Internet Small Computer Systems Interface (iSCSi)" Request for Comment RFC 3720 submitted to Internet Engineering Task Force Network Working Group, pp. 20-48, (2004).

Tseng et al. "Internet Storage Name Server (iSNS)", Internet Draft submitted to the Internet Engineering Task Force, pp. 7-13 (2004).

Japanese Office Action dated Sep. 29, 2009, issued in corresponding Japanese Patent Application No. 2004-150225.

* cited by examiner

FIG. 2

| 2025 | 202500 | 202505 | 202510 |
|---|---|---|---|
| | STRAGE DEVICE IP ADDRESS | TCP PORT NUMBER | ENTITY ID |
| | Mng_IP_Addr_1 | Mng_TCP_1 | Entity_ID_1 |
| | | | |

| 405500 | 405505 | 405510 | 405515 |
|---|---|---|---|
| PORT ID | IP ADDRESS | TCP PORT NUMBER | ESI PORT NUMBER |
| 1-A | IP_Addr_1 | TCP_1 | ESI_1 |
| | | | |

| 406000 | 406005 | 406010 | 406015 | 406020 | 406025 |
|---|---|---|---|---|---|
| VOLUME ID | iSCSI NAME | PORT ID | PGT | LUN | ALLOCATED HOST |
| Vol.1 | Name_V1 | 1-A | 1 | 0 | Name_H1, Name_H2 |
| | | 1-B | 1 | 1 | Name_H3 |
| | | | | | |

| ENTITY ID | PORTAL INDEX | STORAGE NODE INDEX |
|---|---|---|
| Entity_ID_1 | 1, 2, 3 | 1, 2 |
| | | |

| STORAGE NODE INDEX | iSCSI NAME | TYPE | ALIAS |
|---|---|---|---|
| 1 | Name_V1 | target | Vol.1 |
| 2 | Name_V2 | target | Vol.2 |
| | | | |

| PORTAL INDEX | IP ADDRESS | TCP PORT NUMBER | SYMBOLIC NAME | ESI PORT | ESI INTERVAL |
|---|---|---|---|---|---|
| 1 | IP_Addr_1 | TPC_1 | 1-A | ESI_1 | T_e |
| 2 | IP_Addr_2 | TPC_2 | 1-B | ESI_1 | T_e |
| | | | | | |

| PORTAL GROUP INDEX | STORAGE NODE INDEX | PORTAL INDEX | PGT |
|---|---|---|---|
| 1 | 1 | 1 | 1 |
| 2 | 1 | 2 | 1 |
| 3 | 1 | 3 | 0 |
| | | | |

| DISCOVERY DOMAIN ID | STORAGE NODE INDEX |
|---|---|
| 1 | 1, 2 |
| | |

104500, 104505

F I G. 1 4
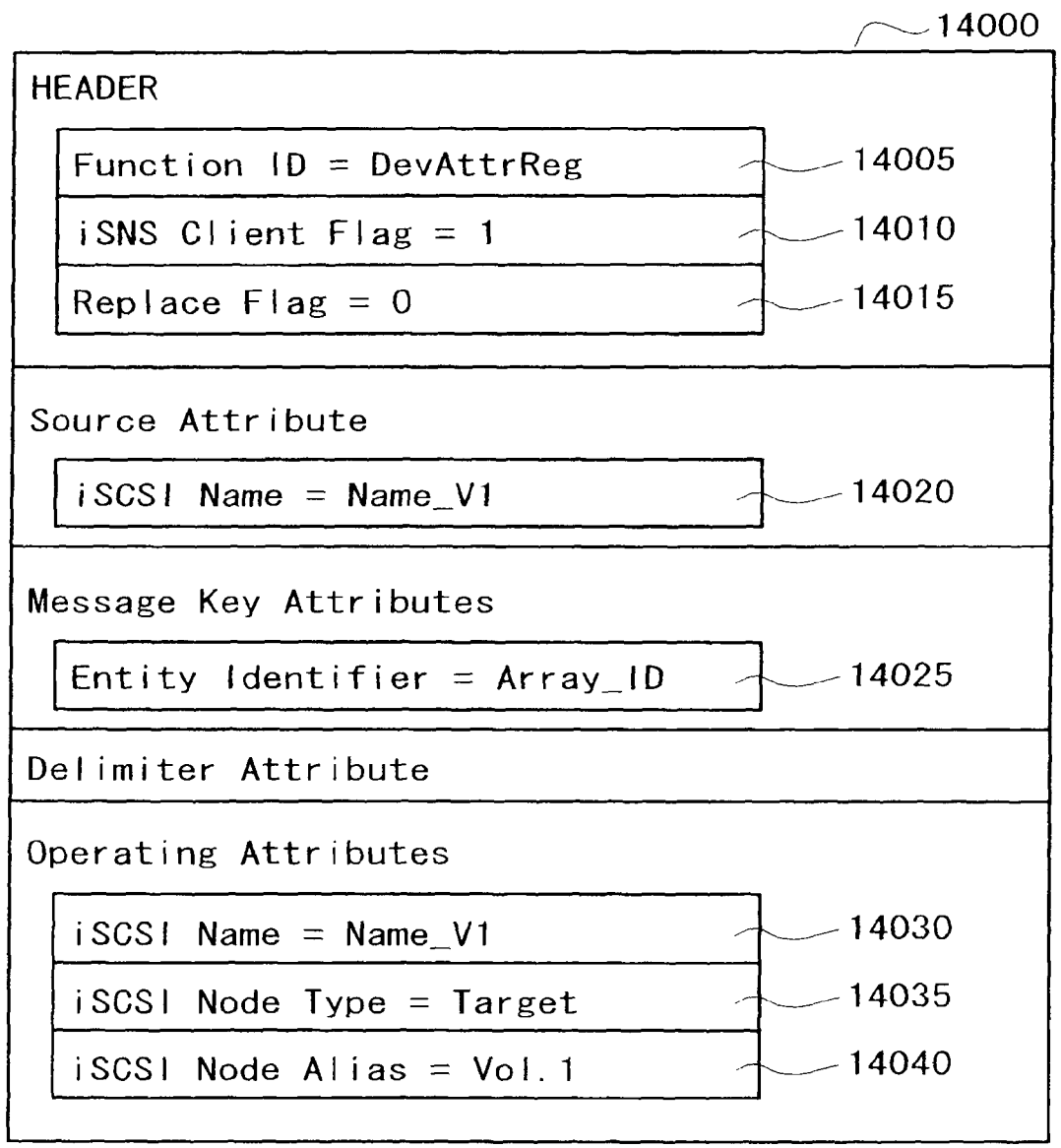

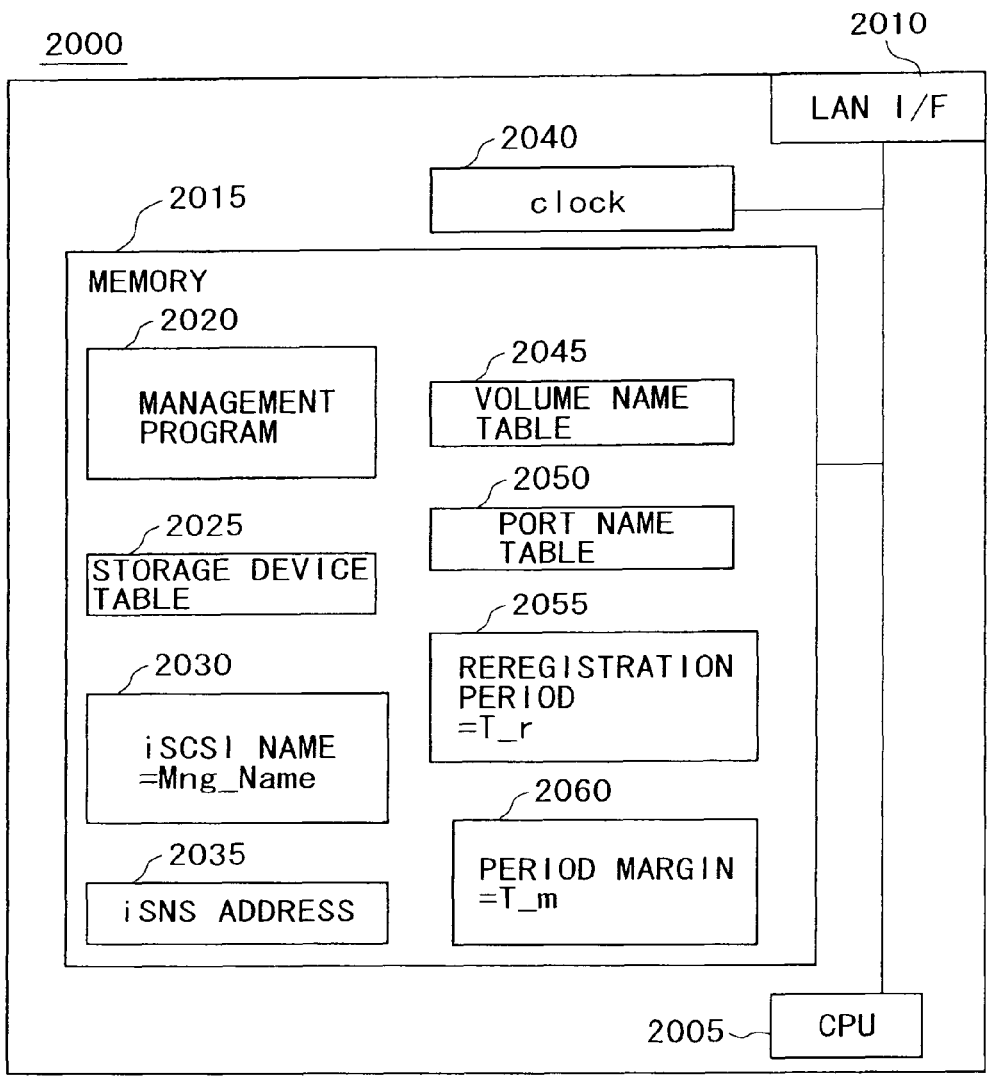

| VOLUME ID (204500) | ENTITY ID (204505) | (VOLUME) NICKNAME (204510) |
|---|---|---|
| Vol.1 | Entity_ID_1 | DB_Vol.1 |
|  |  |  |

| PORT ID (205000) | ENTITY ID (205005) | (PORT) NICKNAME (205010) |
|---|---|---|
| 1-A | Entity_ID_1 | DB_Port1 |
|  |  |  |

| URL | SCOPE LIST | REGISTRATION TIME | ATTRIBUTE | ATTRIBUTE VALUE |
|---|---|---|---|---|
| service:iscsi: target://IP_ Addr_1:TCP_1/ Name_V1 | DEFAULT | Reg_time 1 | iscsi-name | Name_V1 |
| | | | portal-group | 1 |
| | | | | |
| | | | | |

| URL | SERVICE TYPE | SCOPE LIST | lifetime | ATTRIBUTE | ATTRIBUTE VALUE |
|---|---|---|---|---|---|
| service:iscsi:target://IP_Addr_1:TCP_1/Name_V1 | service:iscsi:target | DEFAULT | LT_1 | iscsi-name | Name_V1 |
| | | | | portal-group | 1 |
| | | | | | |
| | | | | | |

37025

3702500 3702505 3702510 3702515 3702520 3702525

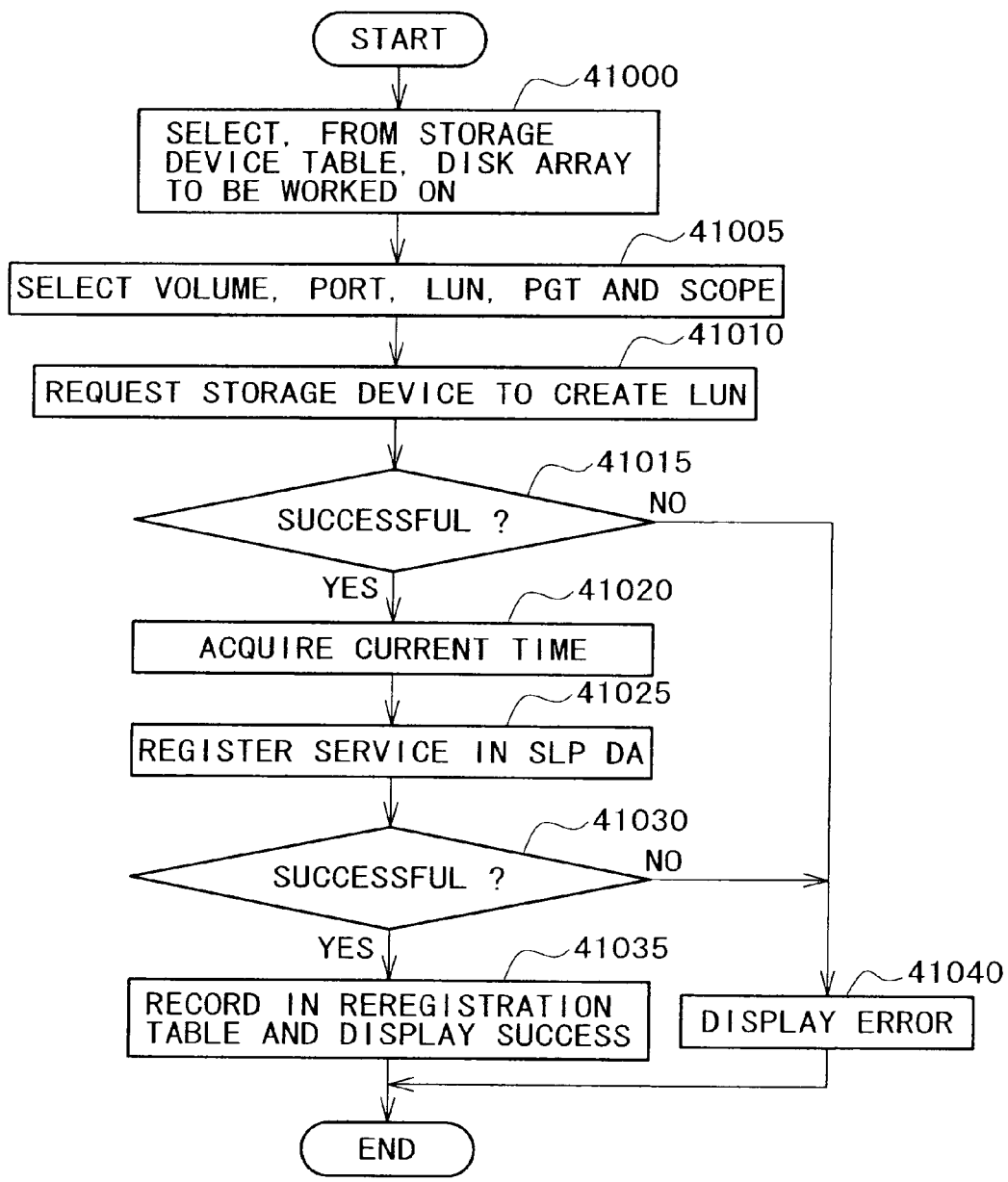

F I G. 4 2
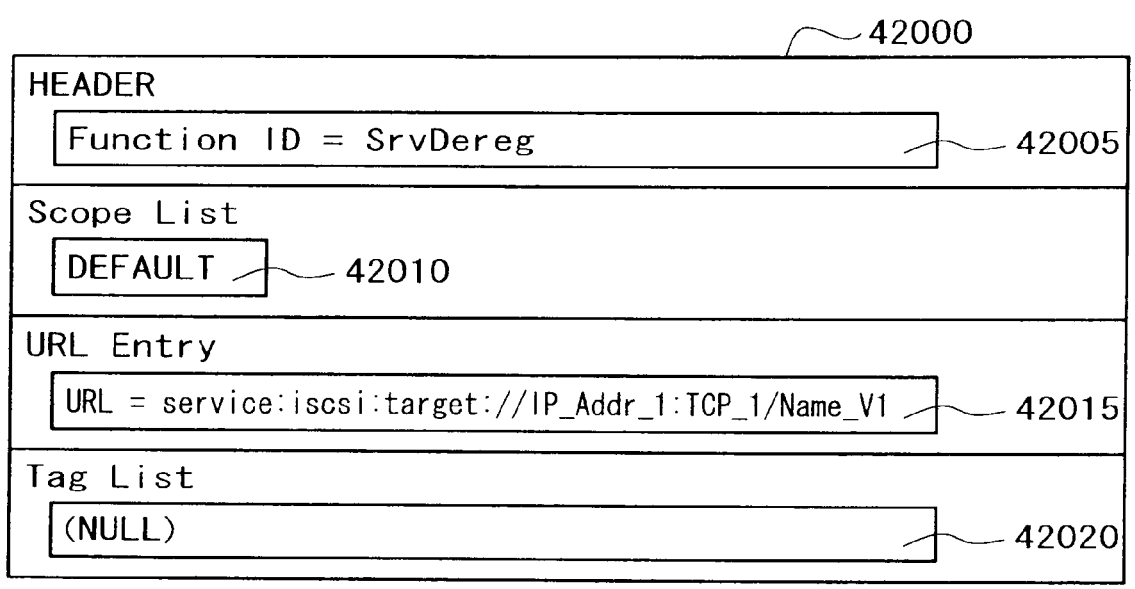

| 202500 | 202505 | 202510 | 202515 | 202520 |
|---|---|---|---|---|
| DEVICE IP ADDRESS | TCP PORT NUMBER | ENTITY ID | REREGIST-RATION TIME | iSNS CLIENT FLAG |
| Mng_IP_Addr_1 | Mng_TCP_1 | Entity_ID_1 | Reg_time1 | TRUE |
|  |  |  |  |  |

2025

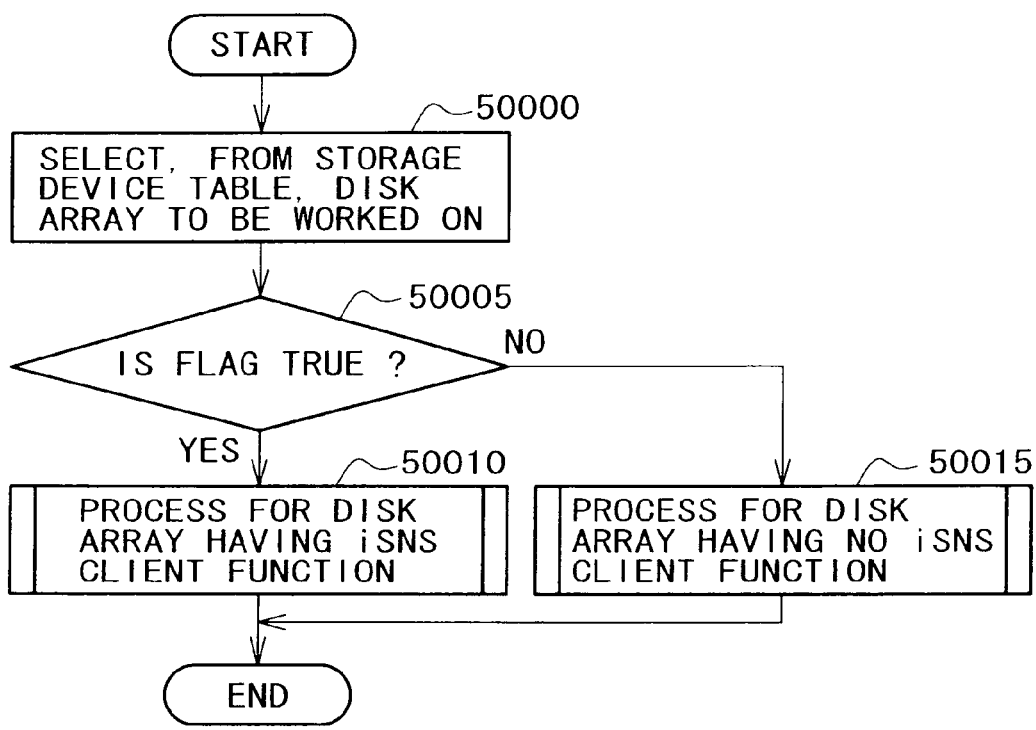

MANAGEMENT METHOD AND A MANAGEMENT SYSTEM FOR VOLUME

CROSS-REFERENCE TO RELATED APPLICATION

This is a continuation application of U.S. Ser. No. 11/905,889, filed Oct. 5, 2007, now U.S. Pat. No. 7,610,467, which is a continuation application of U.S. Ser. No. 11/290,123, filed Nov. 29, 2005, now U.S. Pat. No. 7,296,131, which is a continuation application of U.S. Ser. No. 10/894,983, filed Jul. 19, 2004, now U.S. Pat. No. 7,010,660.

The present application claims priority from Japanese application JP 2004-150225 filed on May 20, 2004, the content of which is hereby incorporated by reference into this application.

BACKGROUND OF THE INVENTION

The following description relates to a management method and management system for storage areas, and more particularly to a management method for storage areas applicable in storage devices, accessed by use of the Internet SCSI (iSCSI) Protocol, to name servers and directories when the configuration of storage areas has been altered and to a management system for executing it.

Storage Area Network (SAN) environments in which host computers and storage devices, such as disk arrays, are connected by a network are in growing use. More recently, interest is focused on the Internet SCSI (iSCSI) which uses an IP network as the SAN and communicates data by mounting the SCSI Protocol on the Transmission Control Protocol (TCP). The iSCSI has the advantage of allowing low-cost architecture of a SAN by making use of existing IP switches and ether cables. An entity for performing iSCSI Protocol communication has "storage nodes" and "portals". A storage node has a unique identifier "iSCSI name" and becomes the sender and receiver of communication. A portal has a network address and provides means of communication. A storage node sends and receives data by mutual communication via a portal.

Details of the iSCSI are described in the following reference, Julian Satran et al., *Internet Draft*, draft-ietf-ips-iscsi-20.txt, pp. 20-48.

An IP network makes possible communication with geographically distant sites, and the number of devices that can be connected within a single network is far greater than what a fiber channel or the like can accommodate. For this reason, if information regarding storage areas accessible by host computers (for instance disk volumes created on a disk array as logical areas) are individually set for each host computer, their management will entail complex work. In view of this problem, there is proposed a method by which disk volumes can be discovered without having to set information on disk volumes for each host computer by placing many nodes that communicate by the iSCSI Protocol under centralized management in a database and having each host computer to acquire information it needs from the database.

Regarding this method, for instance the reference, Josh Tseng et al., *Internet Draft*, draft-ietf-ips-isns-22.txt, pp. 7-13 describes the Internet Storage Name Service (iSNS) in which information on devices capable to be communicated by the iSCSI Protocol is centrally managed. Thus, by having the addresses and port numbers of portals used by a given storage node for communication registered in the iSNS, other storage nodes are enabled to discover that node and to acquire from the iSNS the address they need for communication. Further by dividing each storage node to be managed into groups called discovery domains, the nodes which a given storage node can discover can be limited to nodes registered in the same domain.

Further, the following reference, Mark Bakke et al., *Internet Draft*, draft-ietf-ips-iscsi-slp-07.txt, pp. 4-14, describes a method by which iSCSI nodes are discovered by use of a Service Location Protocol (SLP) which manages information on the services provided within the network. Thus, by registering one storage node and the address and port number of one portal which the node uses for communication in the SLP Directory Agent as the URL of the service, discovery from other nodes is made possible. Further, by designating the node which is permitted to communicate as an attribute of a service to be registered, each node can discover only those nodes it can communicate with.

SUMMARY

In an environment in which the discovery of a storage node in iSCSI uses a database of iSNS or SLP, when the configuration of the storage device has been altered by the creation or deletion of a disk volume or a logical unit number (LUN), a difference arises between the registered contents in the database and the actual configuration of the storage device. This would lead to a situation in which normal discovery is prevented by the difference between the actual configuration and the registered contents in the database.

Or where a storage device has for each LUN a list of the iSCSI names of host computers and a LUN masking function, which allows only the host computers recorded in the list to access any LUN, is provided, in order to allocate LUNs to a given host computer, LUN masking is set by designating the iSCSI name of that host computer. However, in an environment in which a host computer discovers a target device by use of iSNS, if the host computer and the disk volume belong to different discovery domains, even if LUN masking is set, the host computer cannot discover the allocated disk volume, and accordingly the volume allocation intended by the manager cannot be realized. Similarly, in an environment using SLP, unless host computers which can access the attribute of the disk volume registered as a service under SLP are not registered, none of the host computers can discover any accessible disk volume.

Thus, neither iSNS nor SLP according to the prior art has a mechanism to detect any change in storage device configuration and cause it to be reflected in the contents registered in the database. For this reason, when the storage configuration has been altered, no normal discovery is possible until the manager manually updates the database. Moreover, manual updating of the database involves the risk of oversight in registration, wrong registration or unintended deletion of registered items. No manual operation can practically meet the need to alter many disk volumes promptly, and this would invite an unmanageable situation.

As a mode for implementation to solve the problems noted above, contents of any alteration in storage device configuration are caused to be reflected in an information service device via a network. When a volume whose area is logically defined has been created in a storage device, information including at least the iSCSI name of the created volume is caused to be reflected in the information service device via the network. Or when a LUN has been created in a storage device, information including the matching relationship between the volume and the port of the created LUN is caused to be reflected in the information service device via the network. Further, when a volume has been deleted from a storage device, processing to delete the registration of the storage node matching that volume from the information service device is performed. Or when LUN masking is set for a given volume and allocated to a host computer, in an environment in which the iSNS Protocol is to be used, the domain configuration is so altered that the allocated volume and the host computer belong to the same discovery domain.

Or in an environment in which the SLP is used, the iSCSI name of the host computer is registered as an attribute of service representing the allocated volume.

Preferably, the mode should be realized by a management method for storage areas or system to perform processing to provide information on storage devices to be registered to an information service device in which are registered to be managed information on devices capable of communication by a specific protocol, for instance the iSCSI Protocol.

Each storage device holds storage areas each having a unique identifier, network interfaces each having a network address uniquely allocated in a network, and a matching relationship between storage areas and network interfaces, and executes the transmission or updating of the matching relationship in response to a request received via the network.

A management server managing the configuration of the storage devices acquires, from each storage device, the network address of the network interface and the matching relationship between storage areas and network interfaces and, further for registration in a database which the information service device has, transmits to the information service device a request for registration of the matching relationship between storage areas and network interfaces including the identifier of each storage area and the network address of the matching network interface.

In a preferable case, the storage areas should be logically defined volumes formed in the pertinent storage device, the storage device is accessed by the host computer using the iSCSI Protocol, and the information service device is a management database or an iSNS server, communication between the information service device and the management server being accomplished by the iSNS Protocol.

The management server, in a preferable case, should comprise a memory storing a storage device table for recording at least the IP address and the TCP port number of each storage device to be managed and an identifier to the iSCSI device in the network; an iSNS address table for recording the IP address of the iSNS server; a management program for managing the storage device; and a CPU for executing the management program.

Preferably, this CPU should perform first processing, when the configuration of the pertinent storage device has been altered, to send information on that alteration to the iSNS server via the network to have it reflected in the database; second processing, when a logically defined volume has been created in the pertinent storage device, to send information including at least the iSCSI name of the created volume to the information service device via the network to have it reflected in the database; and third processing, when a LUN has been created in the pertinent storage device, to send information including the matching relationship between the volume and the port of the created LUN to the iSNS server via the network to have it reflected in the database.

In another preferable case, in a system in which storage devices having an iSNS client function and storage devices having no iSNS client function are in mixed presence, each of the storage devices should hold a storage area having a unique identifier, a network interface having a network address uniquely allocated in a network, a matching relationship between the storage area and the network interface, and information on whether or not the storage device has an iSNS client function, the device having a step of executing, in response to a request received via the network, transmission or updating of the matching relationship, the management server having a step of causing communication of information on the configuration of storage devices to take place between storage devices having an iSNS client function and storage devices having no iSNS client function; a step of acquiring from any storage device the network address of the network interface, the matching relationship between the storage area and the network interface; a step of acquiring information on whether or not the storage device has an iSNS client function; a step of assessing the acquired information on the presence or absence of an iSNS client function; a step of registering, on the basis of the assessment, the address of the iSNS server in the storage device having an iSNS client function; an edit processing step of editing, on the basis of the assessment, the name of the storage area of the storage device and the port name for the network interface for the storage device having no iSNS client function; and a step of transmitting to the information service device a request for registering the identifier of the storage area, the identifier of the storage area including the network address of the matching the network interface, and the matching relationship of the address of the network interface.

Other features of these methods and systems will become apparent from the following description in this specification when taken in conjunction with the accompanying drawings.

BRIEF DESCRIPTION OF THE DRAWINGS

FIG. 2 shows the configuration of a storage device table 2025 in Embodiment 1.

FIG. 3 shows the configuration of a port table 4055 in Embodiment 1.

FIG. 4 shows the configuration of a volume table 4060 in Embodiment 1.

FIG. 5 shows the configuration of an entity table 1025 in Embodiment 1.

FIG. 6 shows the configuration of a storage node table 1030 in Embodiment 1.

FIG. 7 shows the configuration of a portal table 1035 in Embodiment 1.

FIG. 8 shows the configuration of a portal group table 1040 in Embodiment 1.

FIG. 9 shows the configuration of a discovery domain table 1045 in Embodiment 1.

FIG. 14 shows the configuration of a message of registering a volume in Embodiment 1.

FIG. 25 shows the configuration of a management server 2000 in Embodiment 2.

FIG. 26 shows the configuration of a storage device table 2025 in Embodiment 2.

FIG. 27 shows the configuration of a volume name table 2045 in Embodiment 2.

FIG. 28 shows the configuration of a port name table 2050 in Embodiment 2.

FIG. 38 shows the configuration of a service table in Embodiment 3.

FIG. 41 is a flowchart of LUN creation processing in Embodiment 3.

FIG. 42 shows the configuration of a message of deleting a LUN in Embodiment 3.

FIG. 50 is a flowchart of management program processing in Embodiment 4.

FIG. 51 is a flowchart of reregistration processing in Embodiment 4.

DESCRIPTION OF THE PREFERRED EMBODIMENT

Embodiments (1 through 4) will be described below with reference to the accompanying drawings.

Embodiment 1

In this embodiment having a system configuration in which information on host computers and disk arrays (storage systems) connected by an IP network is managed in the database of an iSNS server, when a management server alters the configuration of storages, the alteration of the disk array configuration is caused to be reflected in the contents registered in the iSNS by use of the function of the disk array and the management server to communicate with the iSNS.

(1) System Configuration

Figure 1:
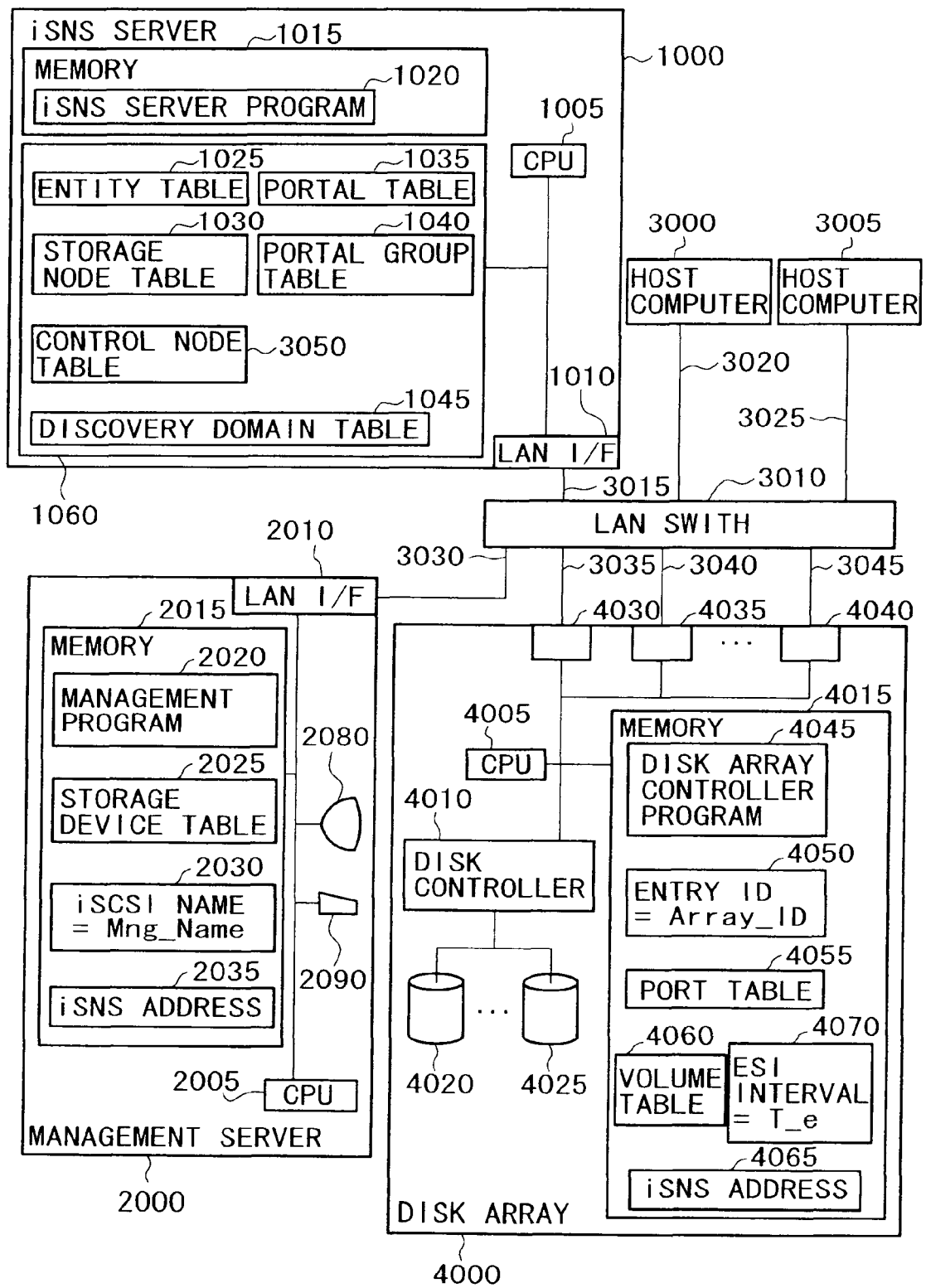
FIG. 1 shows the overall configuration of a system to which Embodiment 1 is applied.

FIG. 1 shows the overall configuration of a system to which Embodiment 1 is applied.

This system comprises an iSNS server 1000, a management server 2000, host computers 3000 and 3005, a disk array 4000, and LAN cables 3015, 3020, 3025, 3030, 3035, 3040 and 3045 constituting a network for connecting the foregoing, and a LAN switch 3010.

The iSNS server 1000 is connected by a LAN interface 1010 to a LAN, has an information database managed by the iSNS server, and provides a function that is defined by the specifications of the iSNS. In accompanying drawings, those parts which relate to functions and operations relevant to the purport of Embodiment 1 are illustrated.

In a memory 1015 is stored an iSNS server program 1020 for realizing the functions of the iSNS server. In a database 1060 are stored an entity table 1025, a storage node table 1030, a portal table 1035, a portal group table 1040 and a discovery domain table 1045. A CPU 1005 executes the iSNS server program 1020. The items of information stated in various tables which the iSNS server 1000 has in the database 1060 are defined by the specifications of the iSCSI and the iSNS. Incidentally, though it was stated that these tables 1025 through 1045 were registered in the database 1060, they may as well be stored in the memory 1015.

The configurations of these tables will be described below.

The entity table 1025, which manages iSCSI devices in the network, has the configuration shown in FIG. 5. Column 102500 of entity IDs records the entity identifier (entity ID) assigned uniquely to each of devices. The devices here mean hardware items connected to the network including host computers, disk arrays and servers, each assigned its own ID. Column 102505 of portal indexes records by portal index the portal which each device has. Similarly, column 102510 of storage node indexes records, by iSCSI node index, the storage node which each device has.

The storage node table 1030, which manages storage nodes in the network, has the configuration shown in FIG. 6. Column 103000 of storage node indexes, column 103005 of iSCSI names, column 1031010 of types, and column 103015 of aliases respectively record iSCSI node indexes each of which is uniquely allocated to a storage node, iSCSI names which are character strings each uniquely allocated, iSCSI node types each representing a node type, and iSCSI aliases as names more understandable to humans than iSCSI names.

The portal table 1035, which manages iSCSI portals in the network, has the configuration shown in FIG. 7. Column 103500 of portal indexes, column 103505 of IP addresses, column 103510 of TCP port numbers, column 103515 of symbolic names, column 103520 of ESI ports and column 103525 of ESI intervals respectively record portal indexes each of which is a number uniquely allocated to a portal, portal IP addresses and portal TCP/UDP ports each allocated to the network interface of a portal, portal symbolic names used as names readily understandable by humans, port numbers of ESI message reception, and the shortest limit of the intervals of ESI message reception.

The portal group table 1040, which manages portal groups representing the matches between storage nodes and the portals used by the respective nodes, has the configuration shown in FIG. 8. Column 104000 of portal group indexes, column 104005 of storage node indexes, column 104010 of portal indexes, and column 104015 of portal group tags (PGTs) respectively record portal group indexes each of which is a number uniquely allocated to a portal group, storage node indexes (iSCSI node indexes) and portal indexes of the storage nodes and the portals constituting each portal group, and portal group tags (PGTs) representing relationships between portal groups. In a given storage node, the presence of portals included in a portal group having the same PGT means capability of coordinated and parallel transmission/reception of data. If a given combination of a storage node and a portal is not registered in the portal group table 1040, it will mean the storage node cannot be accessed via that portal.

The discovery domain table 1045, which manages discovery domains representing groups of mutually discoverable storage nodes, has the configuration shown in FIG. 9. Column 104500 of discovery domain IDs and column 104505 of storage node indexes respectively record discovery domain IDs each of which is an identifier uniquely allocated to a discovery domain and iSCSI node indexes representing storage nodes belonging to each discovery domain.

In a control node table 3050 are recorded the iSCSI names of nodes which the iSNS server 1000 is permitted to access as control node. In this embodiment, the iSCSI name (Mng_Name) 2030 of the management server is supposed to be recorded in advance.

Now referring back to FIG. 1, the management server 2000 has a function to manage storage devices, is connected to a LAN via a LAN interface 2010. In a memory 2015 are stored a storage device table 2025 in which information on storage devices to be managed, namely the disk array 4000, the iSCSI name 2030 which records the management server's own iSCSI Name (Mng_Name), and a management program 2020 which stores an iSNS address 2035 recording the IP address of the iSNS server and provides a storage management function. A CPU 2005 executes this management program 2020. Further, as user interfaces for enabling the manager to perform operations, there are an output device 2080 and an input device 2090.

The management program 2020 has the function of an iSNS client to communicate with the iSNS server 1000 by the iSNS Protocol defined by the specifications of the iSNS. It communicates with the disk array 4000 by a protocol unique to the disk array, and transmits or receives a request for altering the configuration and its result. Details of the operations of the management program will be described afterwards.

The storage device table 2025, which manages a storage device 4000 within the network, such as a disk array, has the configuration shown in FIG. 2. Thus, column 202500 of device IP addresses, column 202505 of TCP port numbers and column 202510 of entity IDs respectively record the IP address and the port number used by each storage device for communication with the management program, and the entity identifier (entity ID) of each device.

Each of the host computers 3000 and 3005 (hereinafter only the host computer 3000, representing both, will be mentioned), though their internal configuration will not be illustrated, has a LAN interface for use in connection to the network, a memory for storing an application program for using the disk volumes provided by the disk array, and a CPU for executing that program. The host computer 3000 further has an iSCSI name necessary for communication with the disk array 4000 by the iSCSI Protocol.

The disk array 4000 communicates with the host computer 3000 by the iSCSI Protocol via LAN interfaces 4030, 4035 and 4040, and a disk controller 4010 provides disk volumes 4020 and 4025 (hereinafter only the disk volume 4020, representing both, will be mentioned unless the other is specified) for controlling data reading and writing. Incidentally, the term "disk volume" refers to a virtual recording area formed on a real storage area the disk array has. Hereinafter disk volume may be called volume.

In a memory 4015 are stored an entity ID 4050 for recording the entity identifier (Array_ID) of the disk array 4000, a port table 4055, a volume table 4060, an iSNS address 4065 for recording the address of the iSNS server, and an ESI interval 4070 for recording the transmission interval (T_e) of the message of the entity status inquiry (ESI) issued by the iSNS server. The memory 4015 also holds a disk array controller program 4045 for controlling the operations of the whole disk array, and the program 4045 is executed by a CPU 4005.

The port table 4055, as shown in FIG. 3, has a configuration for managing the ports (LAN interfaces) which the disk array 4000 has. Thus column 405500 of port IDs, column 405505 of IP addresses, column 405510 of TCP port numbers and column 405515 of ESI port numbers respectively record unique identifiers (e.g. 1-A) each allocated to a port, IP addresses (e.g. IP_Addr_1) and port numbers (e.g. TCP_1) which the ports for iSCSI communication, and port numbers (e.g. ESI_1) of reception of ESI messages from the iSNS.

The volume table 4060, as shown in FIG. 4, has a configuration for managing the disk volumes provided by the disk array 4000, the host computer 3000 which permits access to them, and the ports for use in accessing the disk volumes. Column 406000 of volume IDs, column 406005 of iSCSI names, column 406010 of port IDs, column 406015 of PGTs, column 406020 of LUNs and column 406025 of allocated hosts respectively record unique identifiers (e.g. Vol. 1) and iSCSI names (e.g. Name_V1) each allocated to a disk volume, port IDs (e.g. 1-A) that can be used for accessing disk volumes, portal group tags (e.g. "1") of portal groups consisting of disk volumes and ports, LUNs (e.g. "1") one of which a port to which a disk volume is allocated has, and iSCSI names (e.g. Name_H1) of host computers accessible via allocated ports.

The disk array controller program 4045 receives a request for altering the configuration by communicating with the management server 2000 by a protocol unique to the disk array 4000 and creates or deletes disk volumes or LUNs in addition to the processing of data transfers between the host computer 3000 and the disk volume 4020 by use of the iSCSI Protocol. When creating a volume, it allocates a volume ID and an iSCSI name to the created volume. It also has a LUN masking function to limit access from the host computer 3000 according to information on the allocated host designated for each LUN and a function to set LUN masking to alter the list of the host computer 3000 for permitting access. It further has an iSNS client function to receive and respond to ESI messages.

Next will be described, with reference to flowcharts, operations in the above-described configuration including processing for initial registration of storage device management information, processing to create and delete disk volumes, processing to create LUNs, and processing for additional setting and deletion of LUN masking. These sequences of processing are achieved by executing the management program 2020 of the management server 2000.

(2) Initial Registration

Further in this Embodiment 1, when a storage device whose disk volume and LUN are already defined, such as an existing disk array, is to be added to the objects of management, the management program 2020 registers a storage node and a portal in the iSNS server 1000. These operations will be described with reference to the flowchart of FIG. 10.

The address and the port number at which the additional disk array transmits and receives the request for operation from the management program 2020 are supposed to be registered in advance by the manager in the storage device table 2025. It is further supposed that the entity ID 4050 and the ESI interval 4070 of the additional disk array are defined in advance.

First the manager selects the address and the port number of the disk array to be additionally registered from the storage device table 2025 by manipulating the input device 2090, and instructs the management program 2020 to start the operation for initial registration (step 10000). Then, using the selected address, the management program communicates with the disk array, and acquires from that disk array the entity ID 4050, the port table 4055, the volume table 4060 and the ESI interval 4070 (step 10005). The acquired entity ID is recorded in the entity ID column of the storage device table 2025 (step 10010). Next, the management program 2020 sends the IP address registered at the iSNS address 2035 to the disk array, and requests its registration at the iSNS address 4065 (step 10015). In the disk array, usually this request is executed and the IP address is registered at the iSNS address 4065. The management server 2000 determines whether or not the request has been successfully executed by assessing the response to the request (step 10020) and, if unsuccessful, will end the processing of initial registration by displaying the error on the output device 2080 (step 10055).

If the requested registration is successfully executed, then the contents of the port table 4055 received at step 10005 are transmitted from the management program 2020 to the iSNS server 1000, and are registered in the portal table 1035 (step 10025). This registration processing is executed by communication with the address registered at the iSNS address 2035 by the communication protocol conforming to the iSNS specifications.

Figure 11:
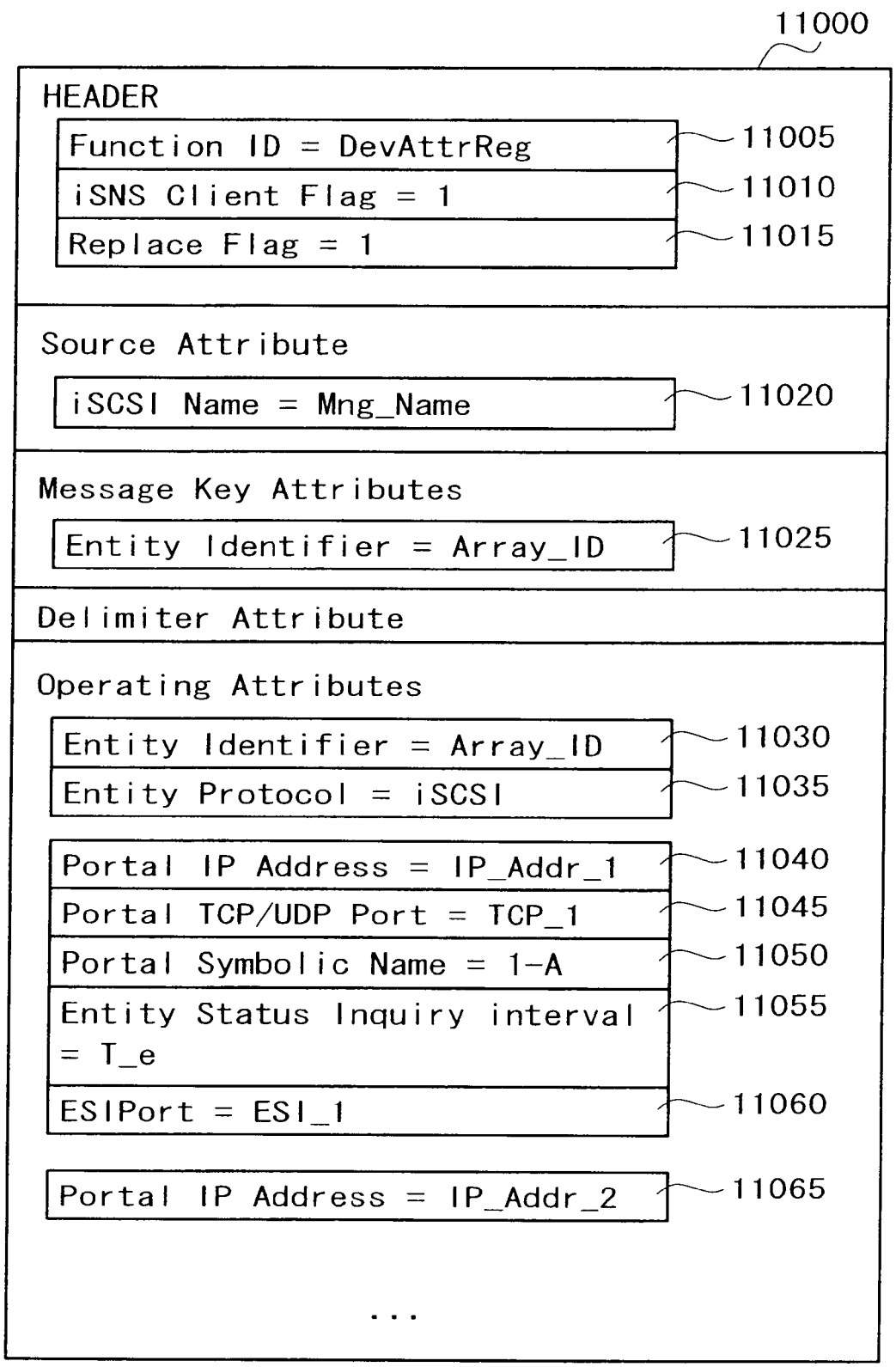
FIG. 11 shows the configuration of a message of registering a portal in Embodiment 1.

More specifically, a device attribute registration request (DevAttrReg) message 11000 by the iSNS Protocol as shown in FIG. 11 is created, and transmitted to the iSNS server. In the Header part of the message, DevAttrReg is designated as the function ID 11005, an iSNS client flag 11010 indicating that the sender is an iSNS client is set, and a replace flag 11015 indicating deletion of the existing contents of the object of registration is set. In the Source Attribute part representing the sender, the iSCSI name of the management server (Mng_Name) 2030 is designated as the iSCSI name 11020. In the Message Key Attributes part representing the object of registration, the entity ID received at step 10005 is designated as the entity ID 11025 of the disk array to be registered. In the Operating Attributes part, the entity ID 11030 of the disk array and the communication protocol (iSCSI) 11035 of the disk array are designated. Further, for each of the ports which the disk array has, the Portal IP Address 11040, Portal TCP/UDP Port 11045 and Portal Symbolic Name 11050 of the portal, and for the ESI Port 11060 the IP address 405505, TCP port number 405510, port ID 405500 and ESI port number 405515 of the port recorded in the port table acquired at step 10005, are designated. In the Entity Status Inquiry Interval 11055 part, the ESI interval acquired at step 10005 is designated. Information items from 11040 through 11060 are designated for each port with the operating attributes of the DevAttrReg message (from 11065 onward). Incidentally, though details are not shown in FIG. 11, each attribute consists, in accordance with the specifications of iSNS, of the combination of an attribute tag denoting the type of the attribute, an attribute length and an attribute value of the attribute to be registered, and is aligned at the boundary of four bytes.

Now referring back to FIG. 10, the management program 2020 receives a device attribute registration response (DevAttrRegRsp), which is a response from the iSNS server to a DevAttrReg message, and determines whether or not the registration has been successfully accomplished (step 10030).

Figure 12:
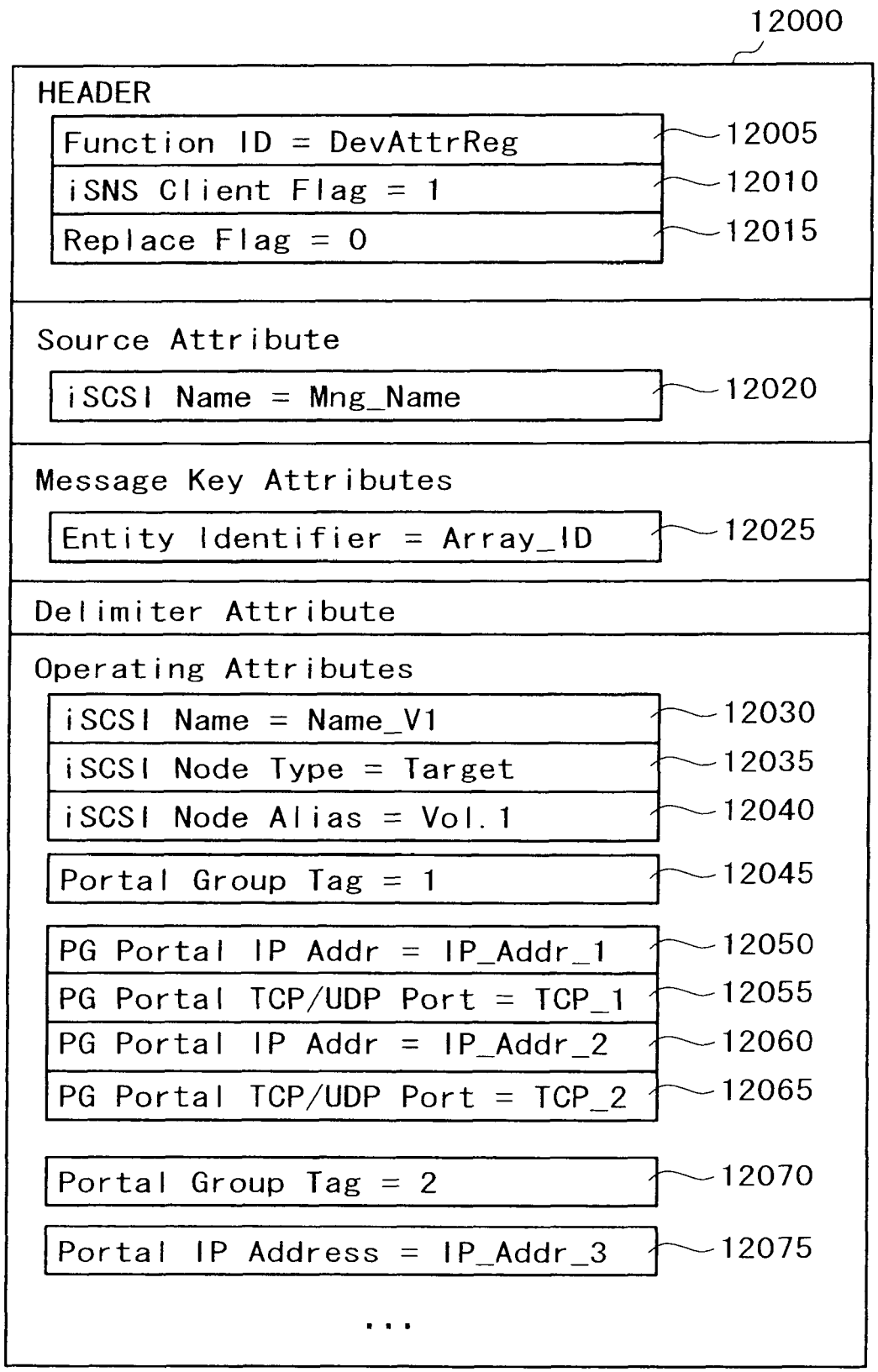
FIG. 12 shows the configuration of a message of registering a storage node and a portal group in Embodiment 1.

If successful, the process advances to step 10035 to select one disk volume from the acquired volume table 4060, a DevAttrReg message as shown in FIG. 12 is created from information registered in the volume table and registered in the iSNS server (step 10040).

In FIG. 12, the Header, Source Attribute and Message Key Attributes parts (12005 through 12025) are the same as in the case of portal registration except that the replace flag of the header is not set. In the Operating Attributes part, the iSCSI name 406005 of the disk volume to be recorded is designated as the iSCSI name 12030 of the storage node, the target as the iSCSI node type 12035, and the volume ID 406000 as the iSCSI node alias 12040. Further, in order to register as a portal group the combination of the disk volume to be registered and the allocated port, PGT 406015 is designated as the portal group tag 12045. As the PG portal IP address 12050 and the PG portal TCP/UDP port 12055, the IP address 405505 and the TCP port number 405510 of the port matching a port ID recorded at the port ID 406010 are respectively designated. For the ports allocated to the disk volume to be registered, information items from 12045 through 12055 are designated (from 12060 onward). However, for ports whose PGT 406015 values are the same, only the information on the PG portal IP address and the PG portal TCP/UDP port will continue to be designated with the designation of the portal group tag being used in common.

Figure 10:
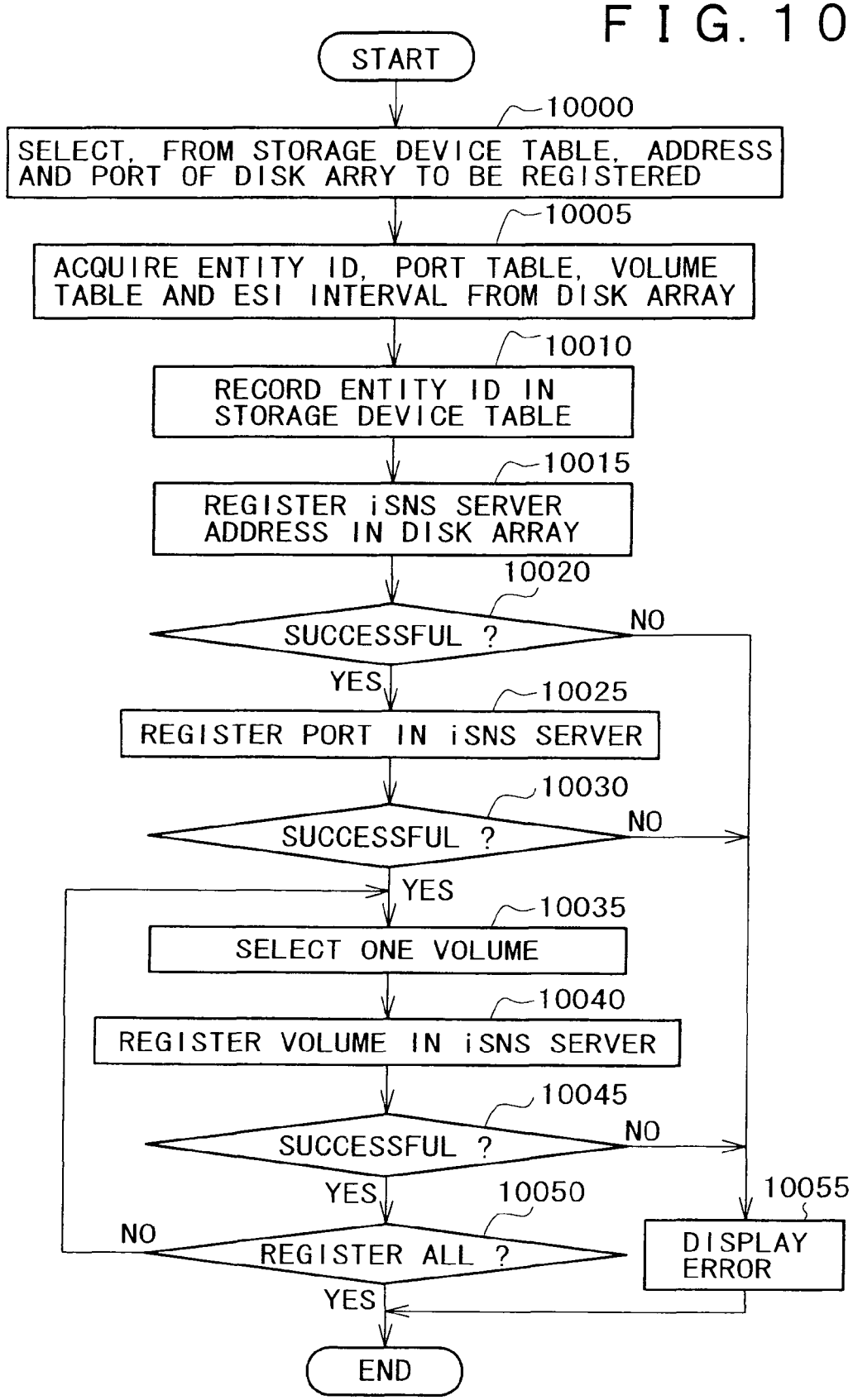
FIG. 10 is a flowchart of initial registration processing in Embodiment 1.

Referring to the flowchart of FIG. 10, a DevAttrRegRsp message is received from the iSNS server 1000 (step 10045) and, if registration fails, the process will advance to step 10055. If registration is successful, processing from step 10035 through 10045 will be repeated for every disk volume recorded in the volume table 4060 (step 10050).

Next will be briefly described the operation by the iSNS server program 1020 having received an iSNS message from the management server 2000 registers in the iSCSI server 1000 the acquired relevant information in an iSNS database 1060.

The iSNS server program 1020, having received DevAttrReg message 11000 (FIG. 11) to register a portal, additionally registers entity identifier 11030 designated by the message in column 102500 of entity IDs in the entity table 1025. It also additionally registers the portal IP address 11040, portal TCP/UDP port 11045, portal symbolic name 11050, ESI interval 11055 and ESI Port 11060 of the designated portal in the respectively corresponding columns in the portal table 1035, and allocates a unique portal index to the portal. It further additionally registers the allocated value of the portal index in column 102505 of portal indexes in the entity table 1025. If there are a plurality of portals to be registered, information of and after 11065 will be similarly registered.

Or having received a DevAttrReg message 12000 (FIG. 12) to register a storage node, the iSNS server program 1020 additionally registers the iSCSI name 12030, iSCSI node type 12035 and iSCSI Node Alias 12040 of the designated storage node in the respectively corresponding columns in the storage node table 1030, and allocates a unique storage node index to the storage node. It also additionally registers the value of the allocated storage node index in column 102510 of storage node indexes in the entity table 1025. It further additionally registers, in the portal group table 1040, the portal index of the portal designated by the PG portal IP address 12050 and PG portal TCP/UDP Port 12055 and the storage node index of the storage node designated by the iSCSI Name 12030, records the value of the portal group tag 12045 in column 104015 of PGTs, and allocates a unique portal group index to the portal group. If there are a plurality of portal groups to be registered, information of and after 12060 will be similarly recorded.

The items of information on the disk array configuration added as objects of registration in the sequence of processing described above can be reflected in the database 1060 of the iSNS server 1000. Incidentally, as the operations according to the iSNS server program 1060 conform to the specifications of iSNS, no further details will be given in this respect in the following description.

(3) Creation and Deletion of Disk Volume

The method of causing any change in the configuration of a disk array by creating or deleting a disk volume in or from it to be reflected in the database of the iSNS server will be described below.

Figure 16:
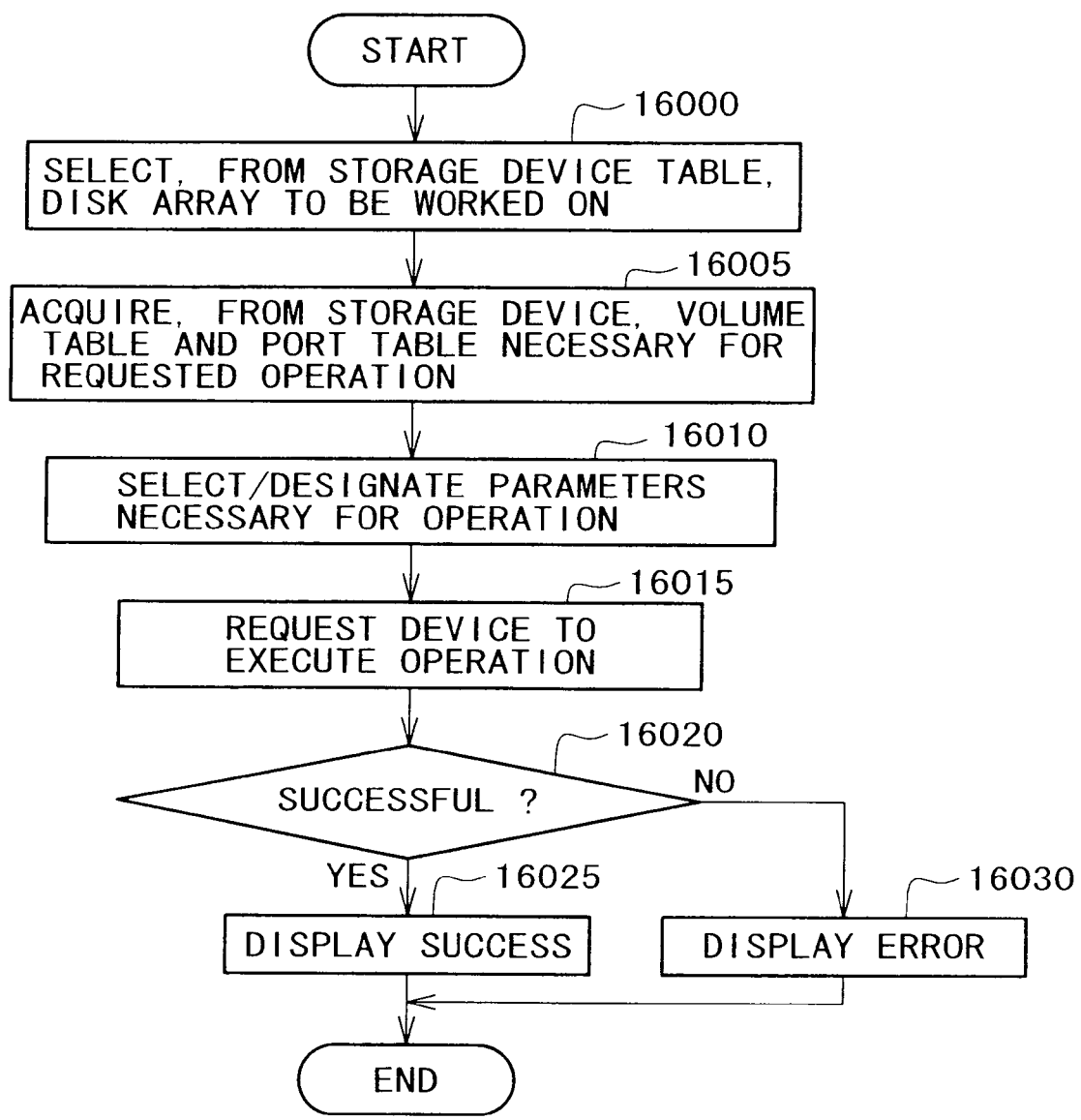
FIG. 16 is a flowchart of the operation of a management program 2020 in Embodiment 1.

First will be described the operations of the management program 2020 with reference to the flowchart of FIG. 16. FIG. 16 shows general operations of the management program which take place when a disk volume is created or deleted or a LUN is created or deleted.

When a volume is to be created, the manager selects, from the storage device table 2025, the disk array to be added by manipulating the input device 2090, and instructs the management program 2020 to create a disk volume (step 16000). When creating a volume, there is no need to acquire the port table 4055 or the volume table 4060. When a volume is to be deleted, the volume table 4060 is acquired to select the disk volume to be deleted (step 16005). When creating a volume, the manager specifies through the input device 2090 parameters needed for volume creation, including the size, and instructs the management program 2020 to create a disk volume (step 16010). When deleting a volume, the manager selects, from the acquired volume table 4060, the disk volume to be deleted, and instructs the management program 2020 to delete the disk volume.

The management program 2020 requests the disk array 4000 to create or delete the specified disk volume (step 16015). The disk array 4000 executes the request processing and returns a response. The management program 2020, if the received response indicates an error (step 16020), will display an error on the output device 2080 (step 16030) and end the processing. Or if the response indicates a success, it will display a success on the output device 2080 (step 16025) and end the processing.

Figure 13:
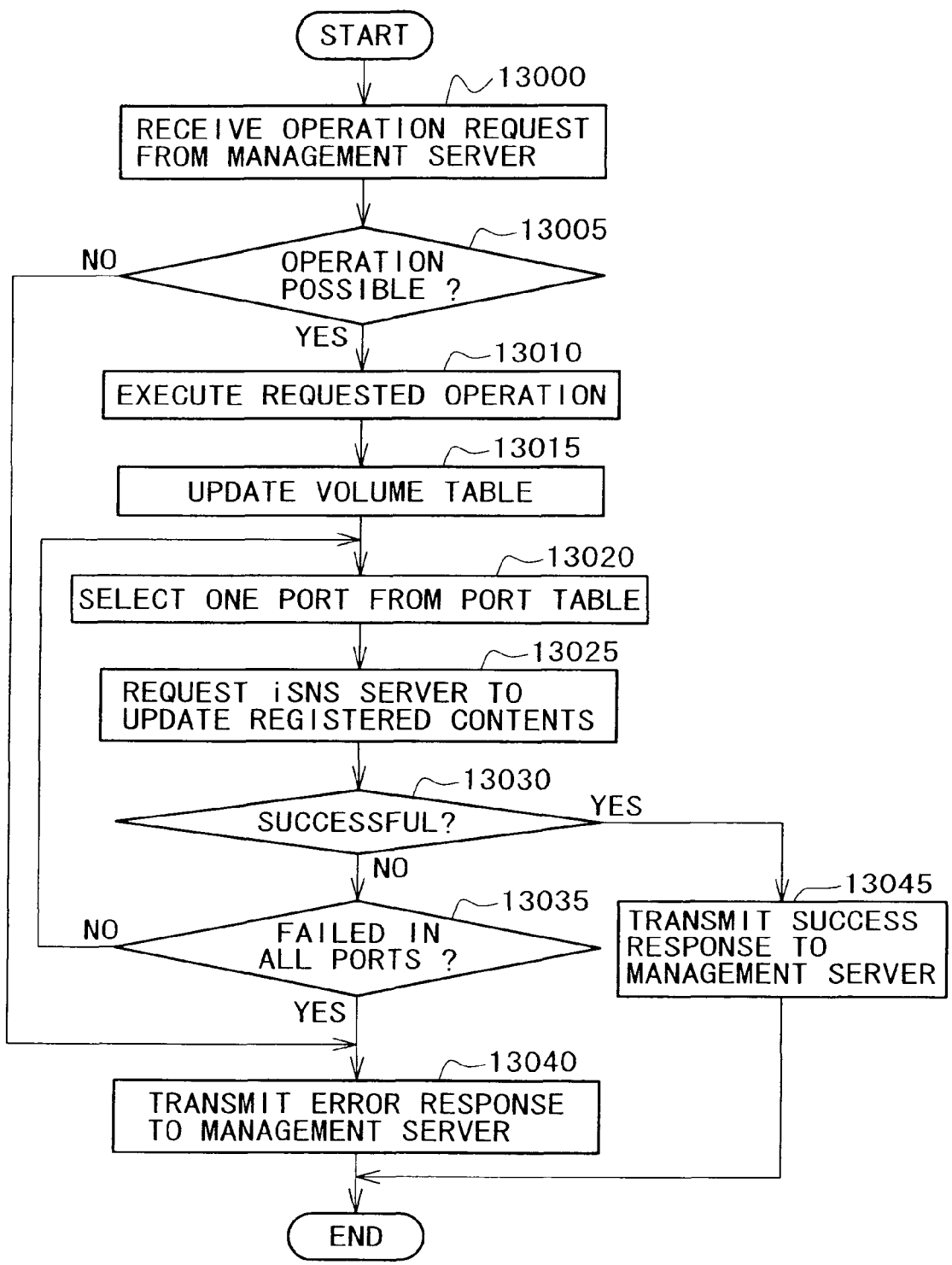
FIG. 13 is a flowchart of the operation of a disk array controller program for disk arrays in Embodiment 1.

Next will be described the operations of the disk array controller program 4045 of the disk array 4000 with reference to the flowchart shown in FIG. 13. FIG. 13 shows general operations of the disk array controller program which take place when a disk volume is created or deleted or a LUN is created or deleted.

Upon receiving from the management program 2020 parameters needed for knowing the contents of and executing the configuration change (step 13000), the disk array controller program determines whether or not the operation is possible (step 13005) and, if impossible, will proceed to step 13040. If possible, it will execute the requested operation (step 13010), and record the result of the operation in, and thereby update, the volume table 4060 (step 13015).

For instance if it is requested to create a volume, the program will create a disk volume on the basis of the parameters specified by the manager, allocate to it a volume ID and an iSCSI name, and add them to the volume table 4060. It records a sign indicating the absence of registration in any other column of the volume table 4060. Or when a volume is to be deleted, it deletes the disk volume selected by the manager and the pertinent row in the volume table 4060.

Next, the program selects one port from the port table 4055 (step 13020), and transmits from that port a message requesting the iSNS server 1000 to update the registered contents (step 13025).

When a volume is to be created, a DevAttrReg message 14000 shown in FIG. 14 is created and transmitted to the iSNS server 1000. While the meaning of each attribute is the same as in the registration of a storage node in initial registration, the iSCSI name of the volume created as an iSCSI name 14020 is designated in the Source Attribute part unlike in registration from the management server 2000. In the Operating Attributes part are designated the iSCSI name 14030 of the created volume, the target as the type 14035 of the storage node, and the volume ID allocated as the iSCSI alias 14040.

Figure 15:
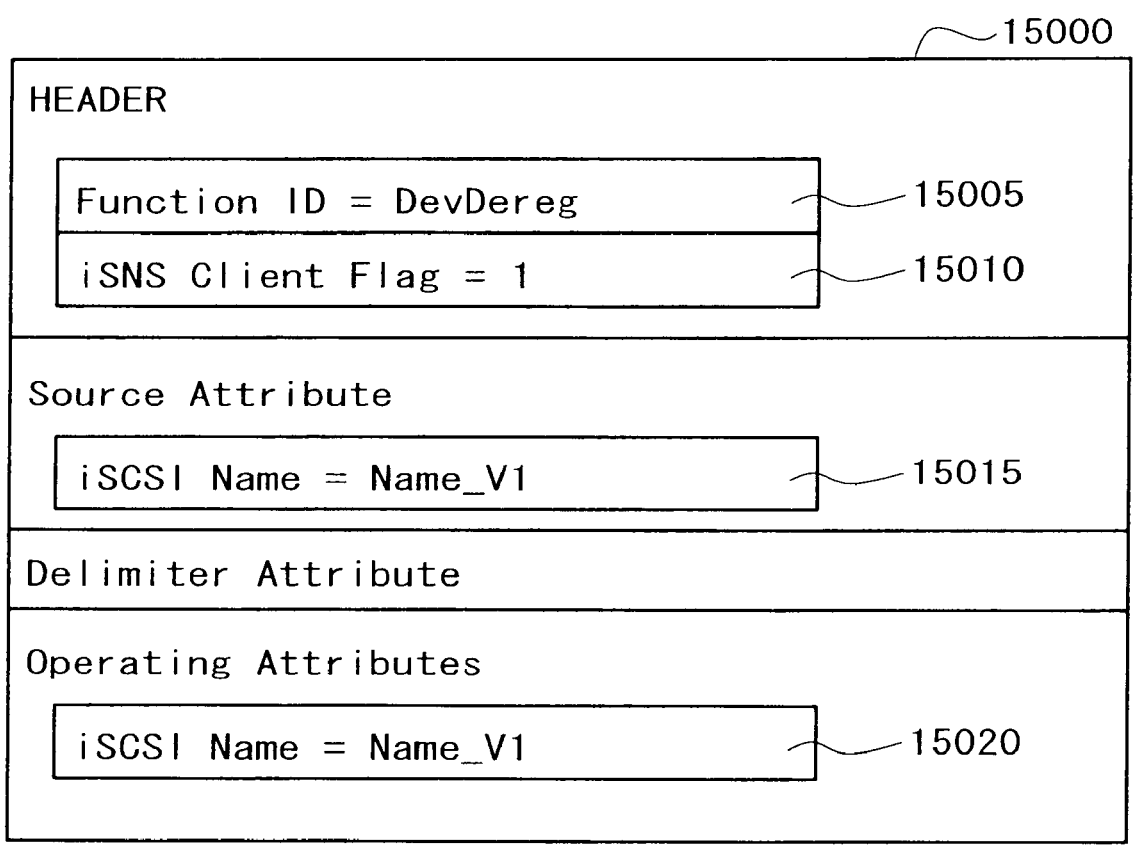
FIG. 15 shows the configuration of a message of deleting a volume in Embodiment 1.

When a volume is to be deleted, a device deregister request (DevDereg) message 15000 as shown in FIG. 15 is transmitted. In the DevDereg message reflecting volume deletion, no message key attribute is designated, but a source attribute 15015 and, in the Operating Attributes 15020 part, the iSCSI name of the disk volume to be deleted as the iSCSI name are designated.

The disk array controller program 4045, receiving a response DevAttrRegRsp or DevDeregRsp to the DevAttrReg message 14000 or the DevDereg message 15000 from the iSNS server 1000, determines whether or not the registration attempt has been successful (step 13030). As a result of the determination, if successful, a response of success will be transmitted to the management program 2020 of the management server 2000 (step 13045), and the processing will be ended. Or if unsuccessful, another port will be selected and the registration request will be repeated (step 13035). If the registration attempt fails at every port, a response of error will be transmitted to the management program 2020 and the processing will be ended (step 13040).

As described above, any change in configuration due to the creation or deletion of a disk volume can be reflected in the database 1060 of the iSNS server 1000 by the processing of the disk array controller program 4045 of the disk array 4000.

(4) Creation and Deletion of LUN

When a LUN is to be created, the management program 2020 acquires the volume table 4060 and the port table 4055 at step 16005 in FIG. 16. The manager selects a disk volume and a port for creating the LUN from the respective tables by manipulating the input device 2090, and designates the value and the port group tag of the LUN to be allocated (step 16010). When a LUN is to be deleted, the volume table 4060 is acquired at step 16005 and the LUN to be deleted is selected (step 16010).

Further regarding the operations of the disk array controller program 4045 for the disk array, when a LUN is to be created, the selected port ID is added at step 13015 in FIG. 13 to the row representing the selected disk volume in the volume table 4060, and the designated PGT and LUN are registered. Or when a LUN is to be deleted, the registered port ID and PGT representing the selected LUN are deleted from the volume table 4060. It has to be noted, however, that the deleted port ID is recorded elsewhere in the memory because it will be required when a message conforming to the iSNS Protocol is to be created.

Figure 17:
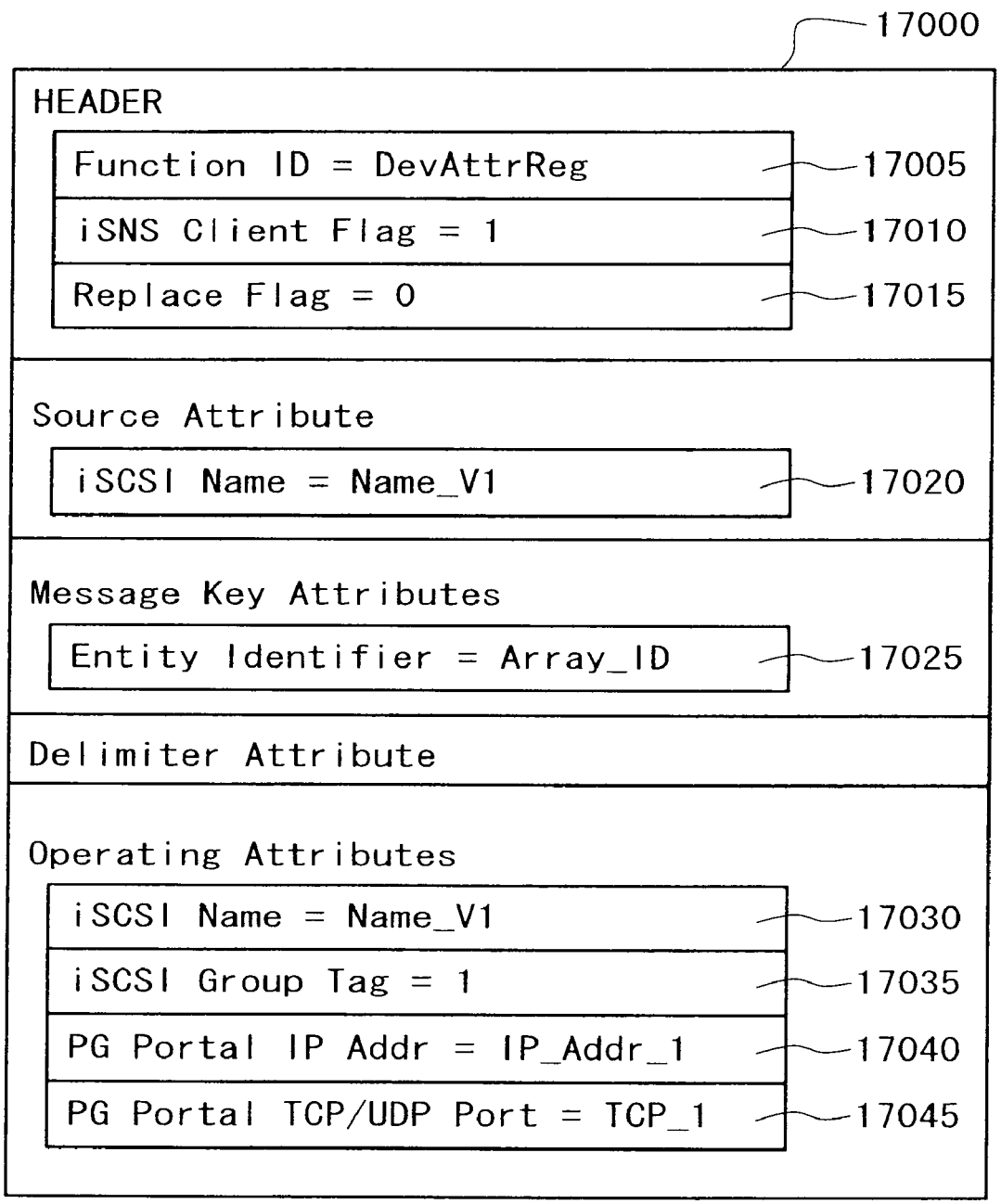
FIG. 17 shows the configuration of a message of registering the creation and deletion of a LUN in Embodiment 1.

Further at step 13025, a DevAttrReg message shown in FIG. 17 is created, and transmitted to the iSNS server 1000. In the Source Attribute part is designated the iSCSI Name 17020 of the disk volume to which the LUN to be worked on is allocated. When a LUN is to be created, in the Operating Attributes part are designated the iSCSI name 17030 of the selected disk volume, the designated portal group tag 17035, and the IP address 17040 and port number 17045 of the selected port.

Or when a LUN is to be deleted, the iSCSI name 17030 of the disk volume of the selected LUN, and the IP address 17040 and port number 17045 of the port of the selected LUN are designated. For the portal group tag 17035, 0 is designated as the attribute length to indicate that the storage node designated in the message cannot be accessed via the designated portal. The iSNS server program 1020 having received a DevAttrReg message containing a portal group tag whose attribute length is "0" deletes the registration of the pertinent portal group from the portal group table 1040.

As described above, any change in configuration due to the creation or deletion of a disk volume can be reflected in the database 1060 of the iSNS server 1000 by the operations of the disk array controller program 4045 of the disk array 4000.

(5) Addition and Deletion of Setting of LUN Masking

When LUN masking is to be set, the disk volume and the host computer which was allocated it should belong to the same discovery domain. Or when the setting of LUN masking is deleted and accessing of the disk volume by a certain host computer is forbidden, it is desirable for the disk volume to be deleted from the discovery domain so that the host computer cannot discover the disk volume. Since a discovery domain can be worked upon only from a control node registered in the iSNS server 1000, the registration is altered by transmitting a message by the iSNS Protocol from the management program 2020.

Figure 18:
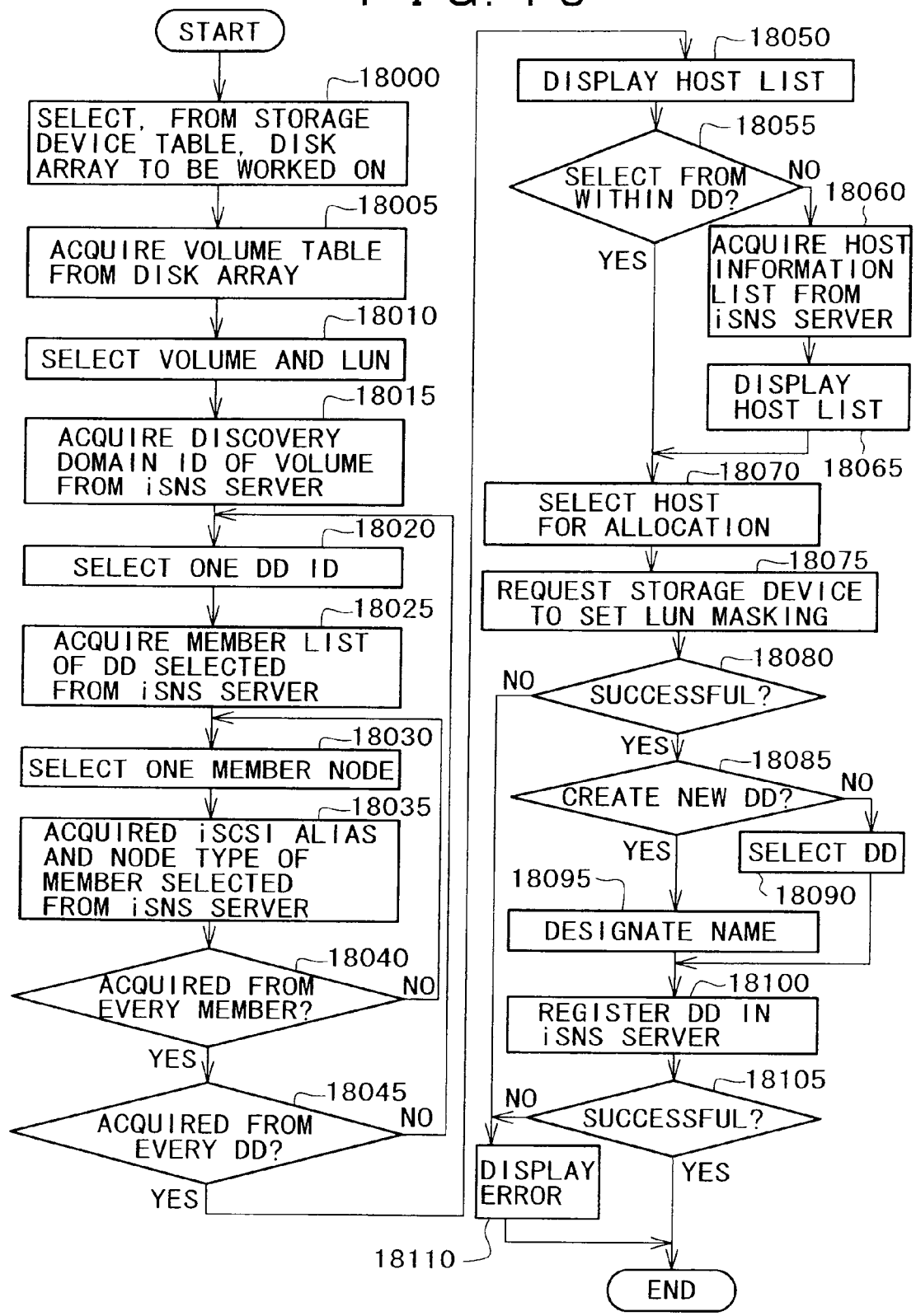
FIG. 18 is a flowchart of processing the additional setting of LUN masking in Embodiment 1.

The operations of the management program to additionally register a host computer to permit access to a certain LUN will now be described with reference to the flowchart of FIG. 18.

First the manager selects the disk array to be worked on from the storage device table 2025 by manipulating the input device 2090, and instructs the management program 2020 to additionally set LUN masking (step 18000). The management program acquires the volume table 4060 from the selected disk array (step 18005). The manager selects from the volume table the disk volume and the LUN which are the objects of LUN masking by manipulating the input device 2090 (step 18010).

Next, whereas the manager has to select the host computer which is to be permitted to access, in this embodiment, first a list of host computers belonging to the same discovery domain as the selected disk volume is displayed on the output device 2080 to show it to the manager (steps 18015 through 18050) and, if the manager instructs selection from outside the discovery domain (step 18055), the list of all the host computers is shown (steps 18060 through 18065) to let the manager to make selection (step 18070).

Figure 19:
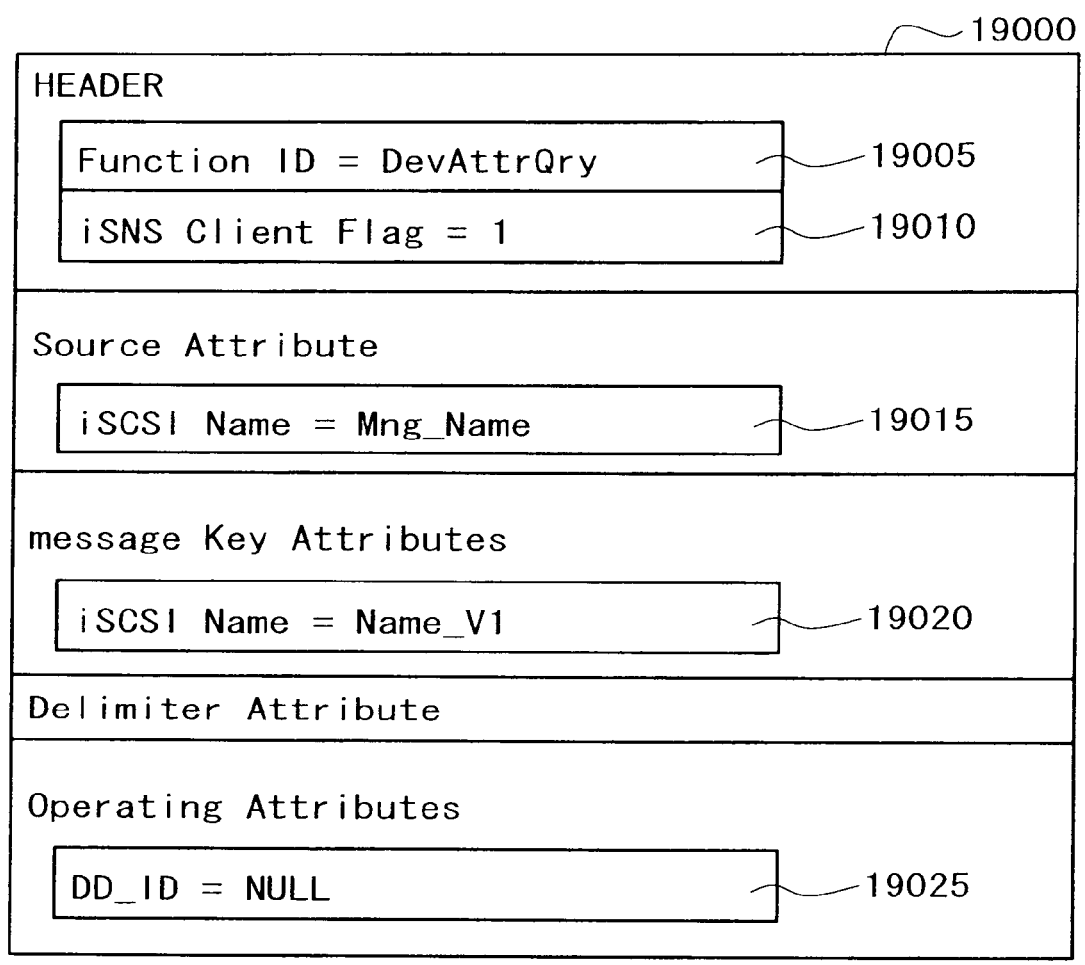
FIG. 19 shows the configuration of a message of acquiring a list of discovery domains in Embodiment 1.

At step 18015, the device attribute query request (DevAttrQry) message shown in FIG. 19 is transmitted to the iSNS server 1000, and a list 1045 of the discovery domain IDs (DD_ID) of the selected disk volume is acquired. In the Message Key Attribute part is designated the iSCSI Name 19020 of the selected disk volume, and in the Operating Attributes part the discovery domain ID, which is the attribute desired to be acquired, is designated with the attribute length 19025 being "0". As a response from the iSNS server 1000, a device attribute query response (DevAttrQryRsp) including a list of DD_IDs is received.

Figure 20:
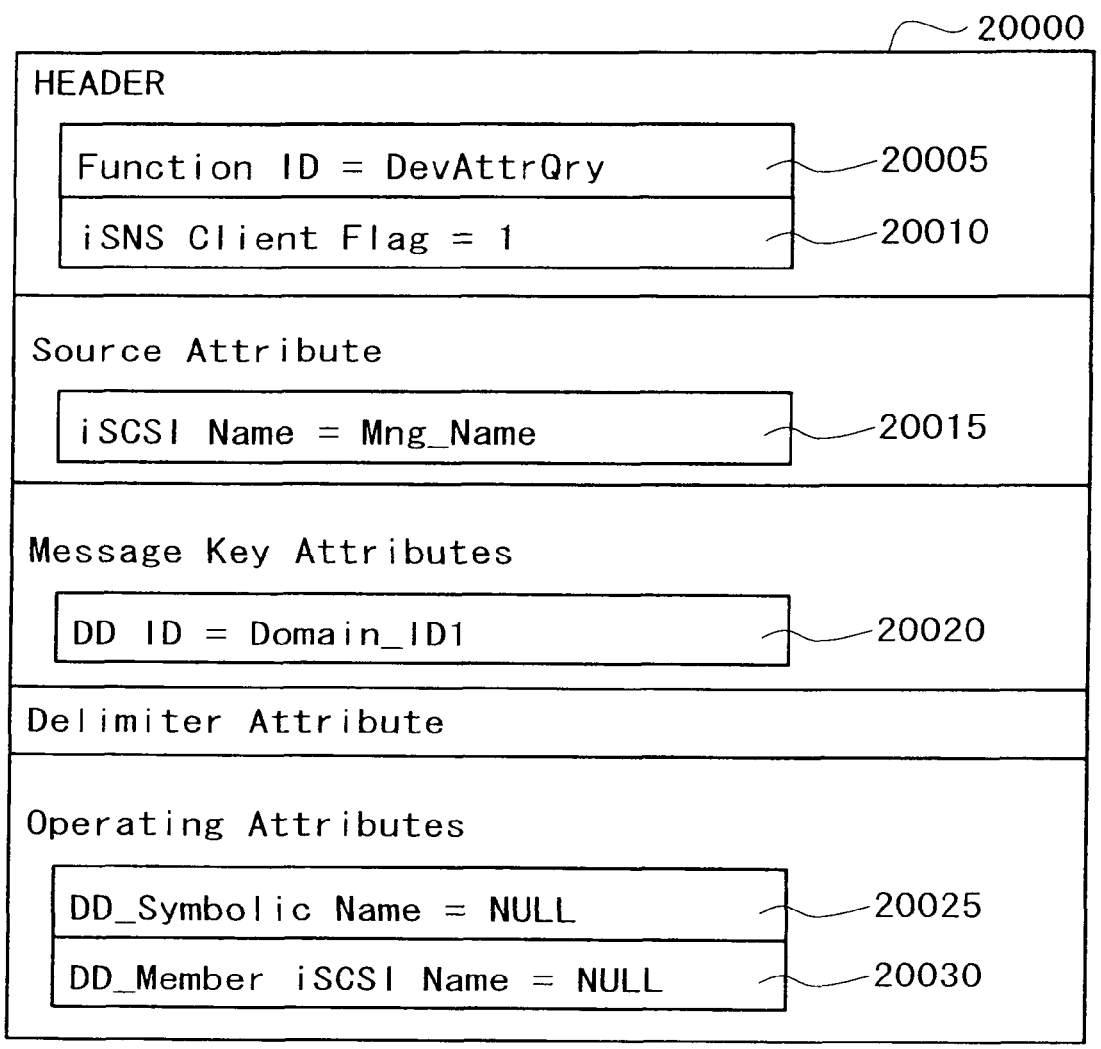
FIG. 20 shows the configuration of a message of acquiring a list of members in a discovery domain in Embodiment 1.

One of the acquired DD_IDs is selected (step 18020), the DevAttrQry message shown in FIG. 20 is transmitted to the iSNS server 1000, and the name of that domain and a list of storage nodes included as members are acquired (step 18025). In the Message Key Attributes part, the selected DD_ID 20020 is designated while in the Operating Attributes part are designated DD_Symbolic Name and DD_Member iSCSI Name, which are the attributes desired to be acquired, with the attribute length 19025 being 0.

Figure 21:
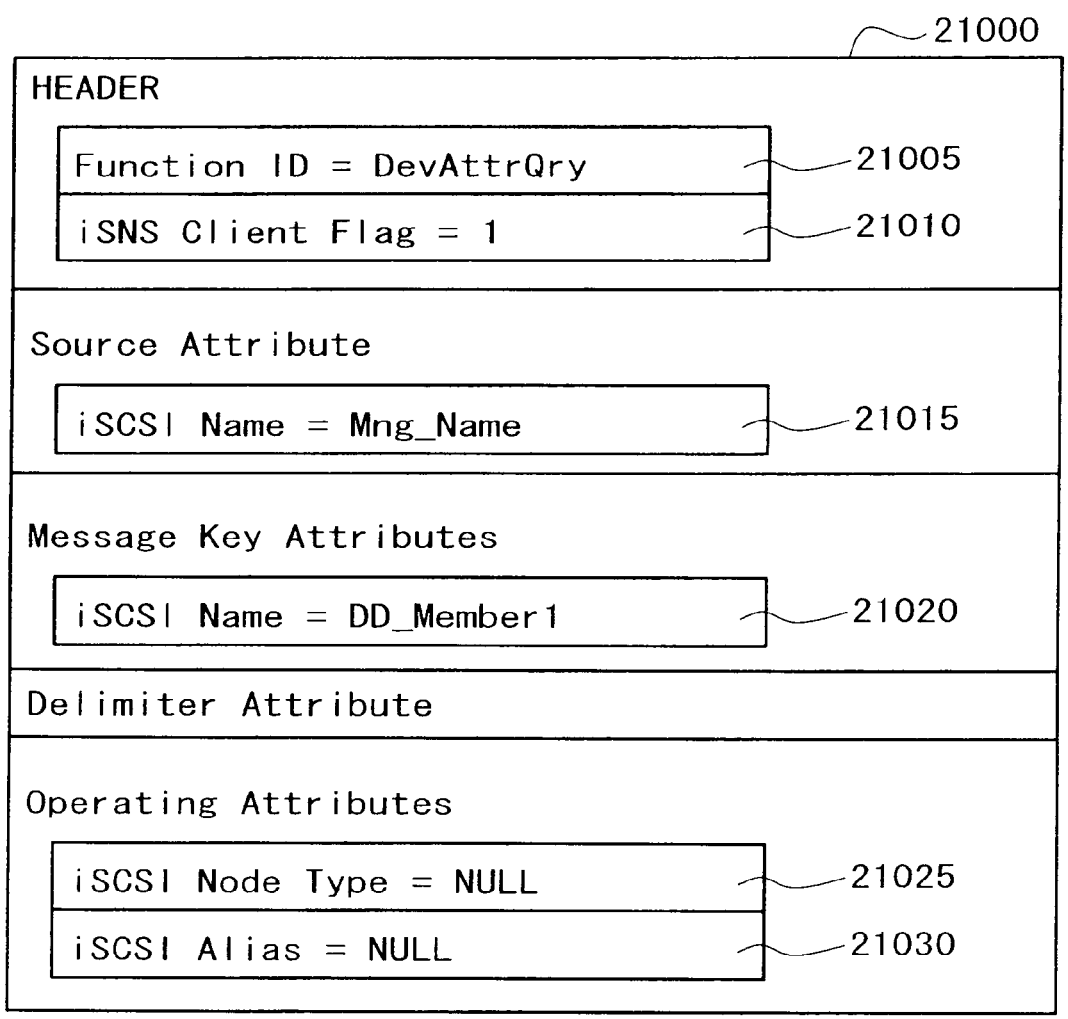
FIG. 21 shows the configuration of a message of acquiring the node type and the name of a storage node in Embodiment 1.

Further, one of the acquired storage nodes is selected (step 18030), the DevAttrQry message shown in FIG. 21 is transmitted to the iSNS server, and the node type and name of the acquired node are acquired (step 18035). In the Message Key Attributes part is designated the iSCSI name 21020 of the selected storage node, and in the Operating Attributes part are designated the iSCSI node type 21025 and iSCSI alias 21030, which are the attributes desired to be acquired with the attribute length 19025 being "0". This is repeated on all the nodes (step 18040) and on all the discovery domains acquired at step 18015 (step 18045).

At step 18050, the manager displays a list of the iSCSI names and the names (iSCSI aliases) of members whose initiators are the names and node types of the domain for each of the discovery domains acquired on the output device 2080 as available alternatives of host computers for setting LUN masking. If the manager instructs to select a host computer from outside that list (step 18055), the same processing as at steps 18015 through 18045 will be performed at step 18060. It has to be noted, however, that the DevAttrQry message created at step 18015, shown in FIG. 19, is to acquire at step 18060 all the discovery domains in the iSNS database without designating any message key attribute. At step 18065, the list of items of information on all the acquired host computers is displayed on the output device 2080.

The manager selects, from the list displayed on the output device 2080, the host computer 3000 on which LUN masking is to be set by manipulating the input device 2090, and instructs the management program 2020 to set LUN masking (step 18070). The management program 2020 requests the disk array 4000 to set LUN masking (step 18075). It determines from the response returned from the disk array 4000 whether or not the setting attempt has been successful (step 18080). As a result of the determination, if unsuccessful, an error message will be displayed on the output device 2080, and the processing will be ended (step 18110).

Or if successful, the disk volume and the host computer on which LUN masking has been set should belong to the same discovery domain. At step 18085, the manager selects whether they should belong to any existing discovery domain or to a newly created domain. If they are to belong to an existing domain, the manager will select one from the list of discovery domains acquired at step 18015 or step 18060 (step 18090). Or if a new discovery domain is to be created, the manager will specify its name from the input device 2090 (step 18095).

Figure 22:
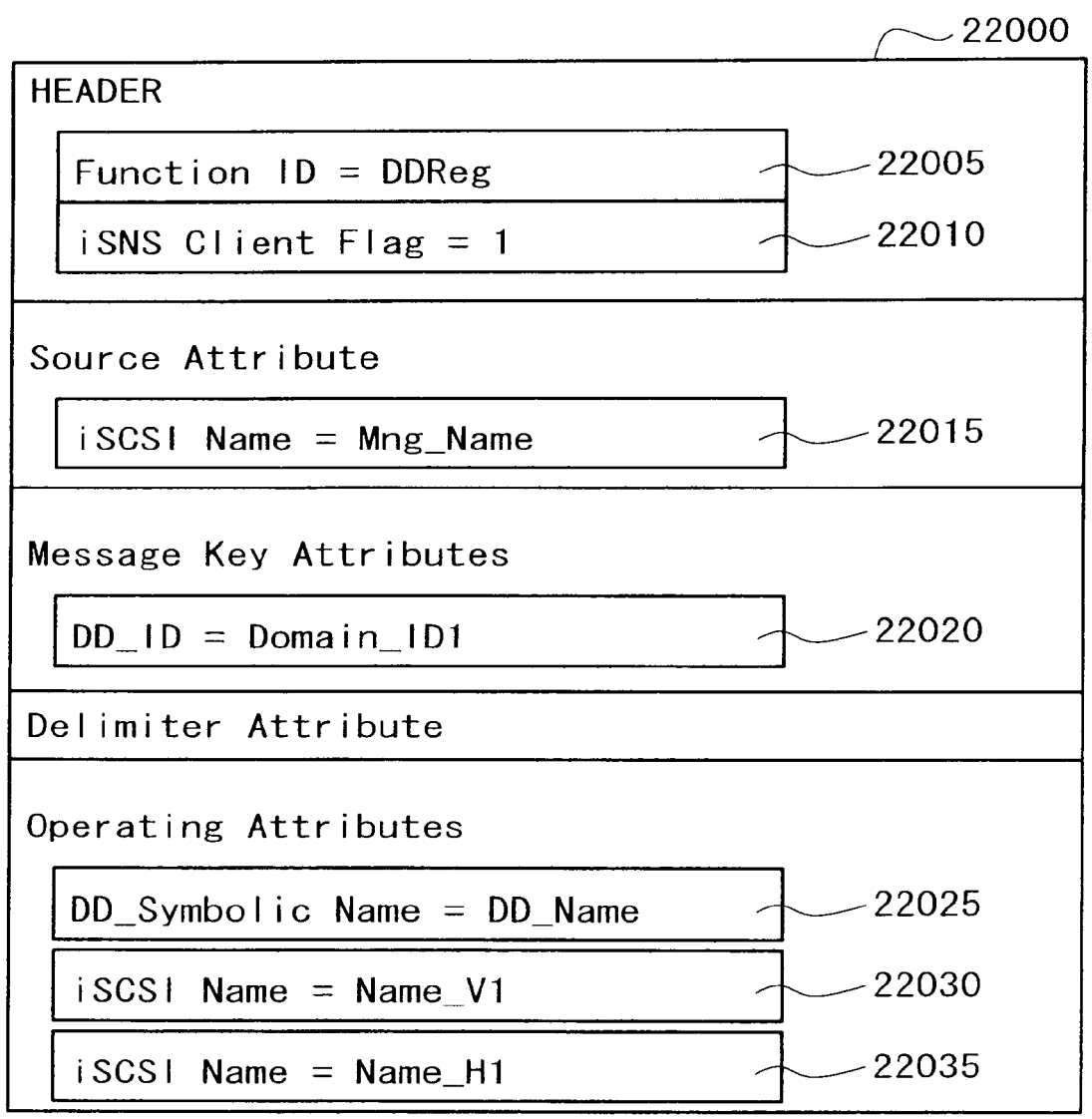
FIG. 22 shows the configuration of a message of registering a member in a discovery domain in Embodiment 1.

At step 18100, a DD register (DDReg) message shown in FIG. 22 is created and transmitted to the iSNS server 1000. Where an existing domain has been selected, in the Message Key Attributes part will be designated the DD_ID of the domain selected as DD_ID 22020. Or where a new domain is to be created, nothing will be designated in the Message Key Attributes part. In the Operating Attributes part, the name of the existing domain or a name designated by the manager as the name of the newly created domain is designated as the DD_Symbolic Name 22025. Also, the iSCSI names of the disk volume and of the host computer are designated as the iSCSI names 22030 and 22035 representing members of the discovery domain.

Figure 23:
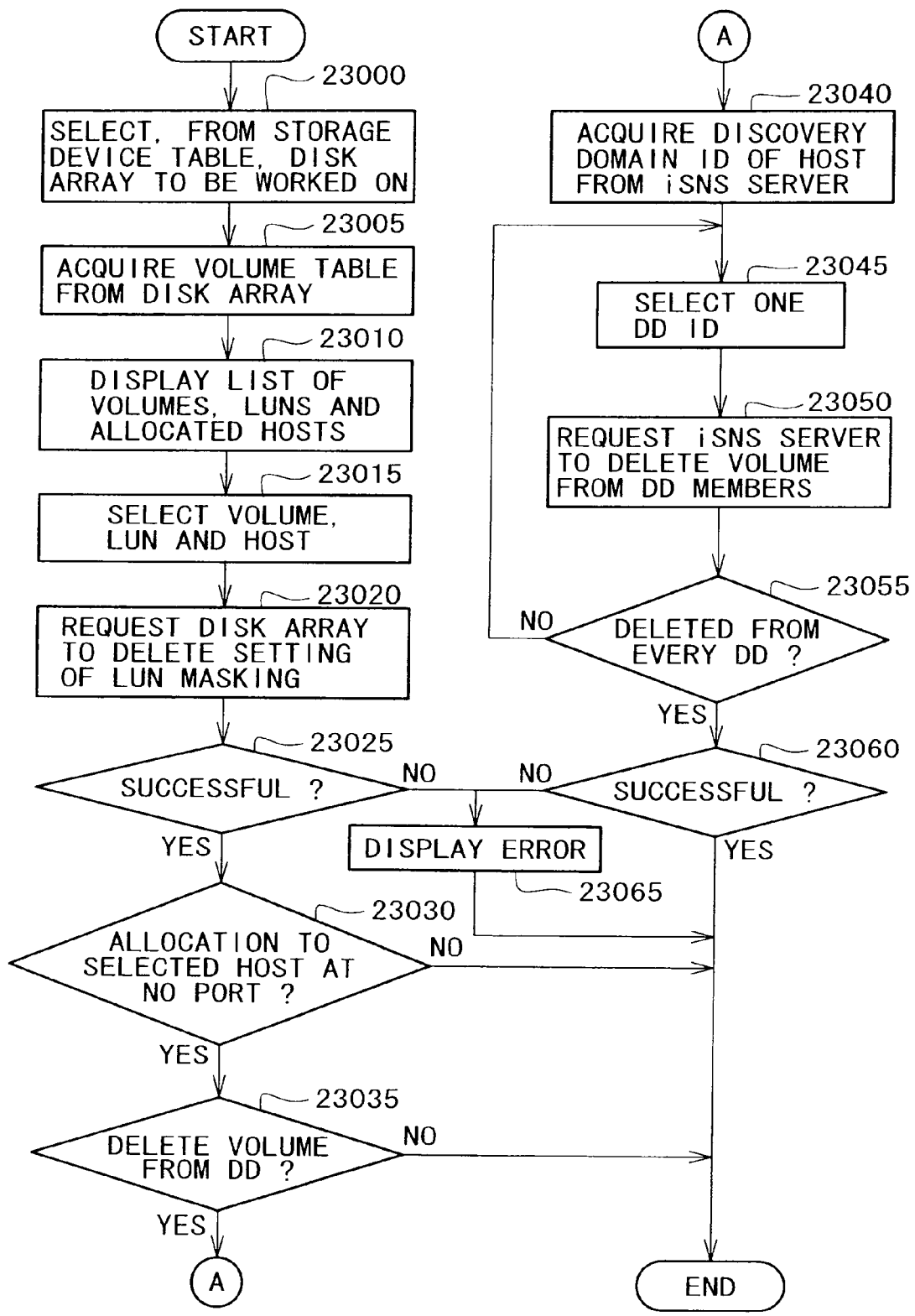
FIG. 23 is a flowchart of processing to delete the setting of LUN masking in Embodiment 1.

Next will be described the operations of the management program 2020 when the host computer to permit access to a certain LUN is to be deleted with reference to the flowchart of FIG. 23. In FIG. 23, steps 23000 and 23005 are respectively similar to steps 18000 and 18005 in FIG. 18.

At step 23010, the list of host computers allocated to the LUNs of the volumes recorded in the acquired volume table is displayed on the output device 2080 as available alternatives of the objects of deletion. The manager selects a combination of volume, LUN and host computer from the list displayed on the output device 2080 as the setting of LUN masking to be deleted, and instructs the management program 2020 to delete the setting of LUN masking (step 23015). The management program 2020 requests the disk array 4000 to delete the setting of LUN masking (step 23020). It then determines from the response returned from the disk array 4000 whether or not the setting deletion has been successful (step 23025) and, if unsuccessful, will display an error message on the output device 2080 and end the processing (step 23065).

Or if successful, with the acquired volume table displayed on the output device 2080 being referenced, it will be checked whether or not the selected disk volume is allocated to the selected host computer at any port and, if it is allocated to any port, the processing will be ended (step 23030). If the selected host computer is allocated to no port, the disk volume can be deleted from the list of members of the discovery domain to which the host computer belongs because that host computer need not discover the selected disk volume. Whether or not to actually delete it is specified by the manager and, if non-deletion is opted for, the processing will be ended (step 23035).

Figure 24:
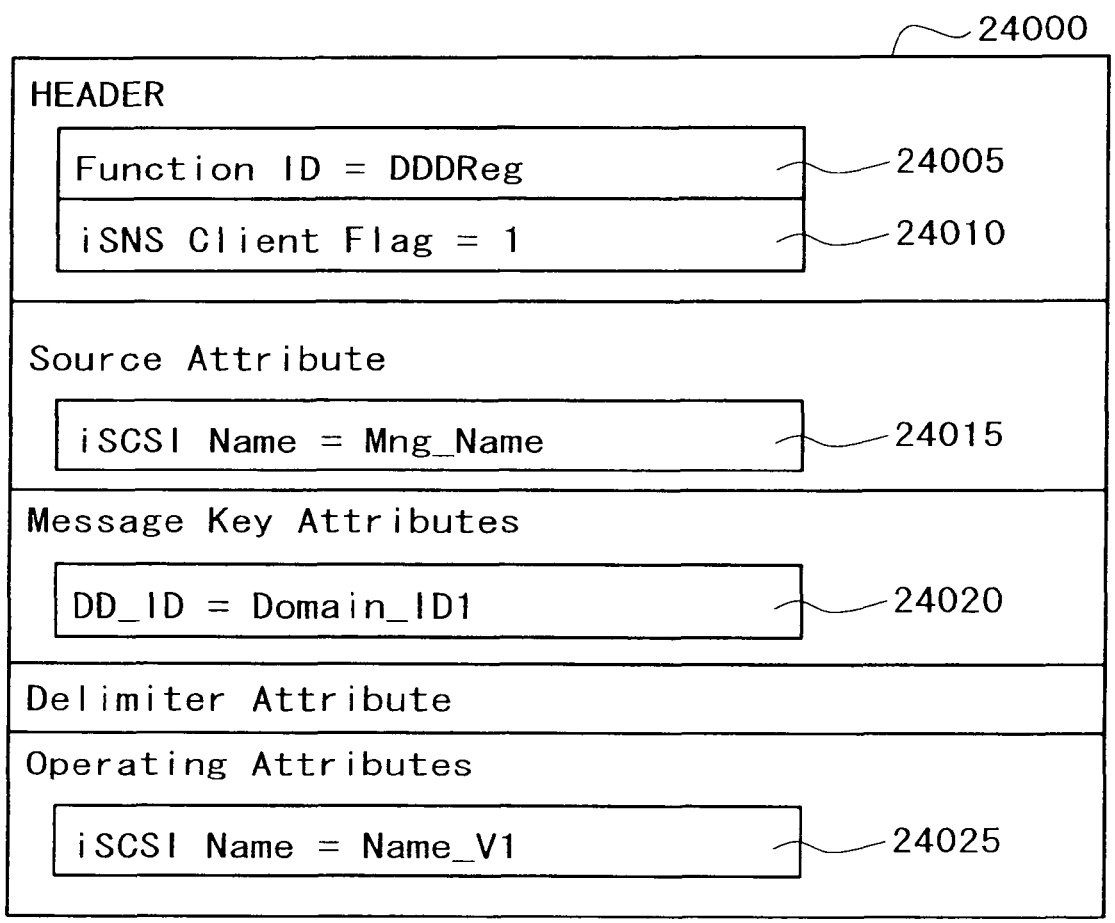
FIG. 24 shows the configuration of a message of deleting a member from a discovery domain in Embodiment 1.

If it is to be deleted, the DevAttrQry message shown in FIG. 19 will be transmitted to the iSNS server 1000, and a list of discovery domains to which the host computer belongs will be acquired. In the Message Key Attributes part will be designated the iSCSI name of the host computer. One of the acquired discovery domains is selected (step 23045), the DD Deregister (DDDreg) message shown in FIG. 24 will be created at step 23050, and it is transmitted to the iSNS server. In the Message Key Attributes part is designated the DD_ID 24020 of the selected discovery domain. In the Operating Attributes part is designated the iSCSI name 24025 of the disk volume to be deleted from the members of the discovery domain. Steps 23045 and 23050 are repeated on everyone of the discovery domains acquired at step 23040 (step 23055) and, if any deletion request fails (step 23060), the processing will be ended with an error message displayed (step 23065).

As described above, by the operations executed by the management program 2020, it is possible to alter the configuration of discovery domains managed by the database 1060 of the iSNS server 1000, interlocked with configurational changes resulting from the creation or deletion of LUN masking.

This Embodiment 1 enables configurational changes in storage devices resulting from the addition of any disk array, creation or deletion of any volume, or creation or deletion of any LUN to be reflected in registration in the database of the iSNS server 1000. It also enables the configuration of any discovery domain to be altered, interlocked with configurational changes resulting from the creation or deletion of LUN masking.

Embodiment 2

The system configuration of this embodiment is substantially similar to that of Embodiment 1 shown in FIG. 1 except in the following respects. Thus, in Embodiment 2, the disk array controller program 4045 of the disk array 4000 has no iSNS client function, and all the necessary operations on the iSNS server 1000 are performed by the management program 2020 of the management server 2000. It further provides a function to enable the manager to name any disk volume or port as desired, and to register the names so given in the database of the iSNS server 1000 as an iSCSI alias or a portal symbolic name.

The method of altering the setting LUN masking in this embodiment is similar to that in Embodiment 1. Differences from Embodiment 1 will be described in detail below.
(1) Configurations of Management Server and Disk Array FIG. 25 shows the configuration of the management server 2000 in this embodiment.

Referring to FIG. 25, the storage device table 2025 has a configuration shown in FIG. 26. Herein, in column 202510 of reregistration times are recorded the next registration times for periodically reregistering the contents of registration regarding various devices in the iSNS database. If "0" is entered in this column, the management program 2020 will perform no reregistration regarding that device (disk array). A clock 2040 is a clock for informing the management program 2020 of the current time.

A volume name table 2045, which records matches between disk volumes and their respective names, has a configuration as shown in FIG. 27. Thus, column 204500 of volume IDs, column 204505 of entity IDs and column 204510 of names respectively record the volume ID of the disk volume 4020, the entity ID of the disk array 4000 which provides the disk volume 4020, and the name which the manager assigned to the disk volume. A port name table 2050, also having a similar configuration to the volume name table 2045 as shown in FIG. 28, records the matches between different ports and their names.

As the reregistration period, the period T_e of registration in the iSNS database is recorded, and as the period margin 2060, a margin T_m for starting reregistration processing not later than the reregistration time recorded in the storage device table 2025 is recorded. The values of T_e and T_m are supposed to be specified in advance by the manager.

The disk array controller program 4045 of the disk array 4000 in this embodiment, unlike its counterpart in Embodiment 1, has no iSNS client function. Accordingly, it has neither the iSNS address 4065 nor the ESI interval 4070.

Incidentally in FIG. 25, illustration of the output device 2080 and the input device 2090 is dispensed with.

Figure 29:
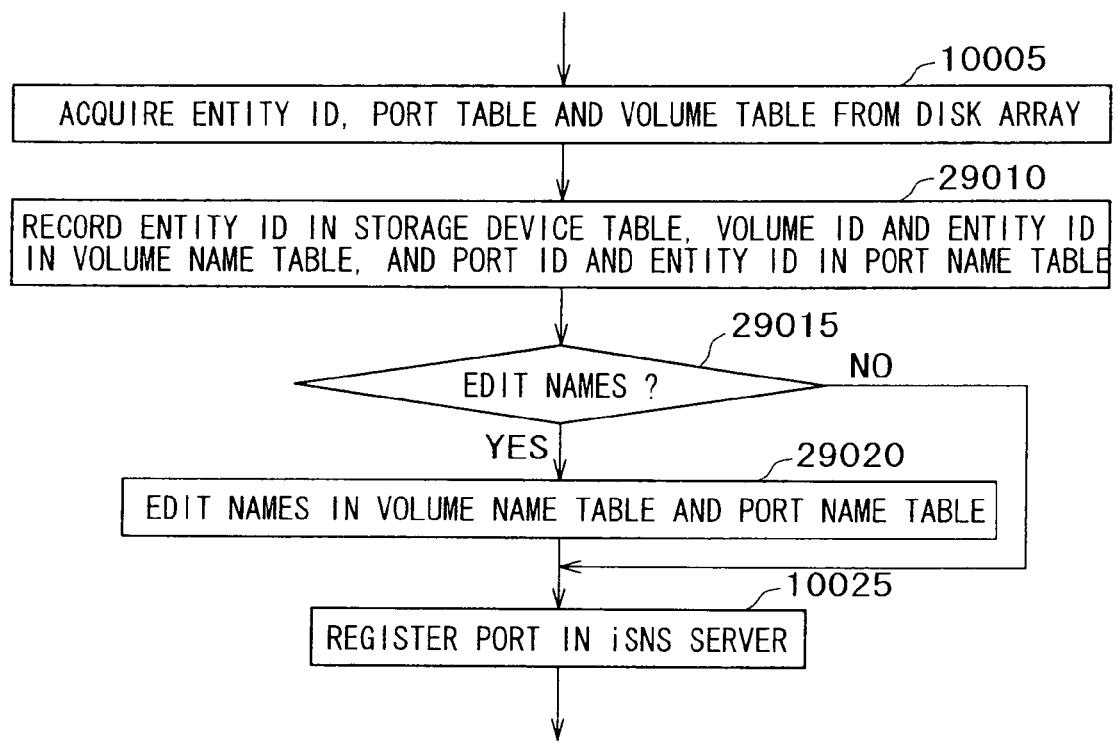
FIG. 29 is a flowchart of initial registration processing in Embodiment 2.

Operations in this configuration including the processing of initial registration of storage device management information, that of disk volume creation and deletion, that of LUN creation and deletion, and reregistration processing will be described below with reference to flowcharts.
(2) Initial Registration Initial registration in this embodiment, though substantially similar to that in the procedure shown in FIG. 10, includes the assignment of names by the manager to the disk volume and the port. As shown in FIG. 29, the procedure between step 10005 and step 10025 in FIG. 10 is replaced by the procedure between step 29010 and step 29020. At step 29010, an entity ID is recorded in the storage device table 2025, a volume ID and an entity ID are further recorded in the volume name table 2045, and a port ID and an entity ID are recorded in the port name table 2050.

Further, a volume ID and a port ID are recorded in the columns of names in the volume name table 2045 and of the port name table 2050.

At step 29015, whether or not to edit names is selected by the manager by manipulating the input device 2090. In the case of editing names, the manager will record names designated for each disk volume and each port respectively in the volume name table 2045 and the port name table 2050 (step 29020). In the case of not editing names, the volume IDs and the port IDs recorded at step 29010 will remain as names.

At step 10025, a message in which a reregistration period T_r 2055 is designated as the registration period in addition to the operating attributes shown in FIG. 11 is created and transmitted to the iSNS server 1000. Further, the current time read from the clock 2040 augmented with the registration period designated by a DevAttrRegRsp message from the iSNS is registered in the row of reregistration times in the storage device table 2025.

Since the disk array 4000 in this embodiment has no iSNS client function, steps 10015 and 10020 in FIG. 10 are dispensed with. The acquisition of an ESI interval at step 10005 is also dispensed with.

Not only in initial registration but in creating a message by the iSNS Protocol, as attributes for which port IDs or volume IDs were previously recorded, such as the portal symbolic name 11050 in FIG. 11 or the iSCSI alias 12040 in FIG. 12, names recorded in the port name table and the volume name table are registered. For the source attribute, the iSCSI name Mng_Name of the management server is designated.

(3) Creation and Deletion of Volume

In this embodiment, the disk array has no iSNS client function, but a request for altering the storage configuration from the management program 2020 is met within the disk array. Since the operations regarding this part are similar to their counterparts in Embodiment 1 unless otherwise stated expressly, operations of the management program 2020 will be mainly described regarding this embodiment.

Figure 30:
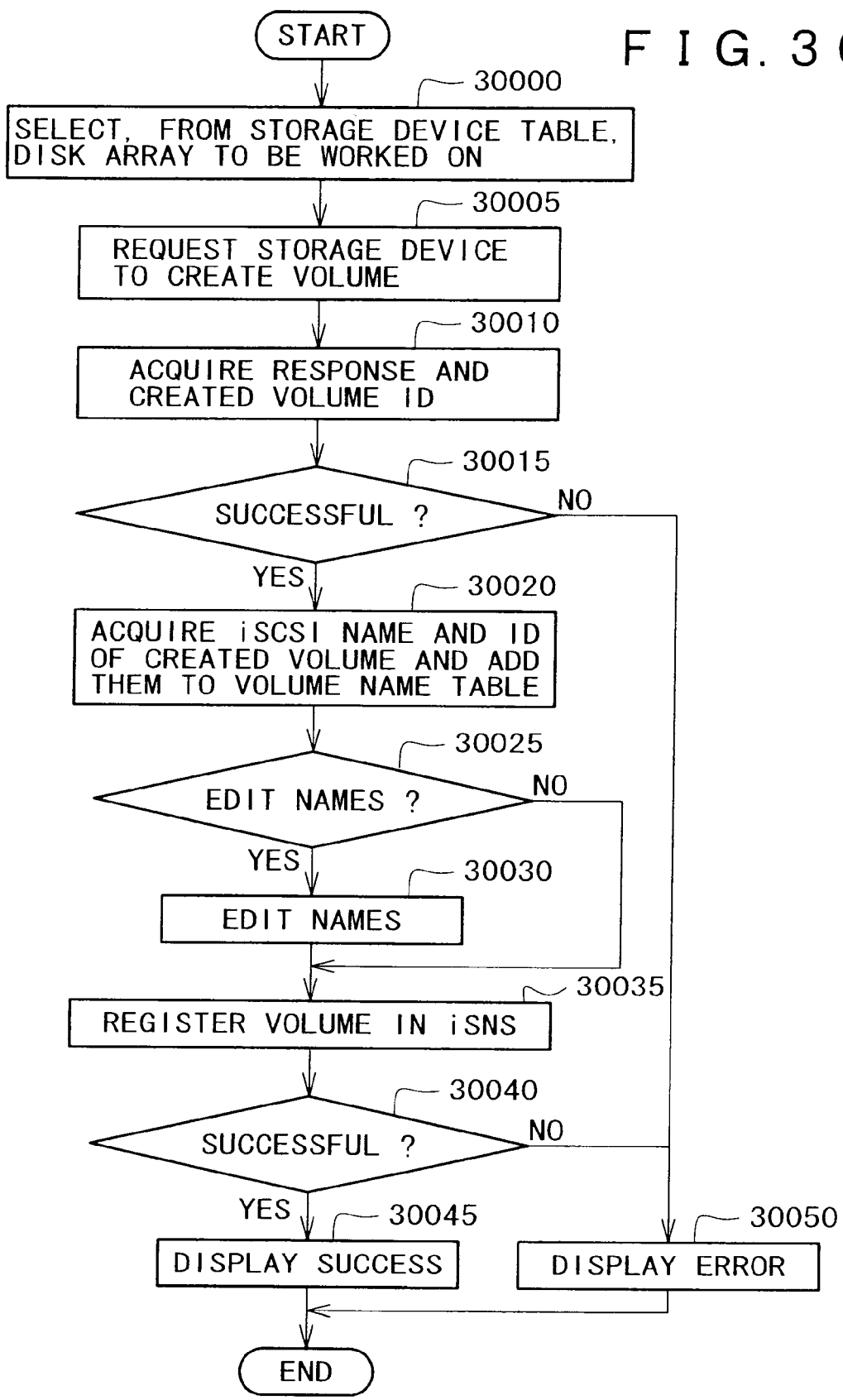
FIG. 30 is a flowchart of volume creation processing in Embodiment 2.

The operations of the management program in creating a volume will be described with reference to the flowchart of FIG. 30.

As a response to the request to the disk array 4000 for volume creation at step 30005, if the creation is successful, the volume ID of the disk volume created at step 30010 will be received. In the successful case, the volume table 4060 is received from the disk array 4000, and an iSCSI name and a volume ID matching the received volume ID are added to the volume name table 2045 (step 30020). The volume ID is also recorded in the column of names in the volume name table 2045. Further, the manager selects by manipulating the input device 2090 whether to edit the name of the created disk volume (step 30025). If it is selected to edit the name, the name designated by the manager will be edited, and the edited name will be recorded in the volume name table 2045 (step 30030).

Then at step 30035, the DevAttrReg message shown in FIG. 14 is created, and transmitted to the iSNS server 1000. The created volume is registered in the database 1060 of the iSNS server 1000. From step 30040 onward, the processing is similar to that from 16020 onward in FIG. 16.

Figure 31:
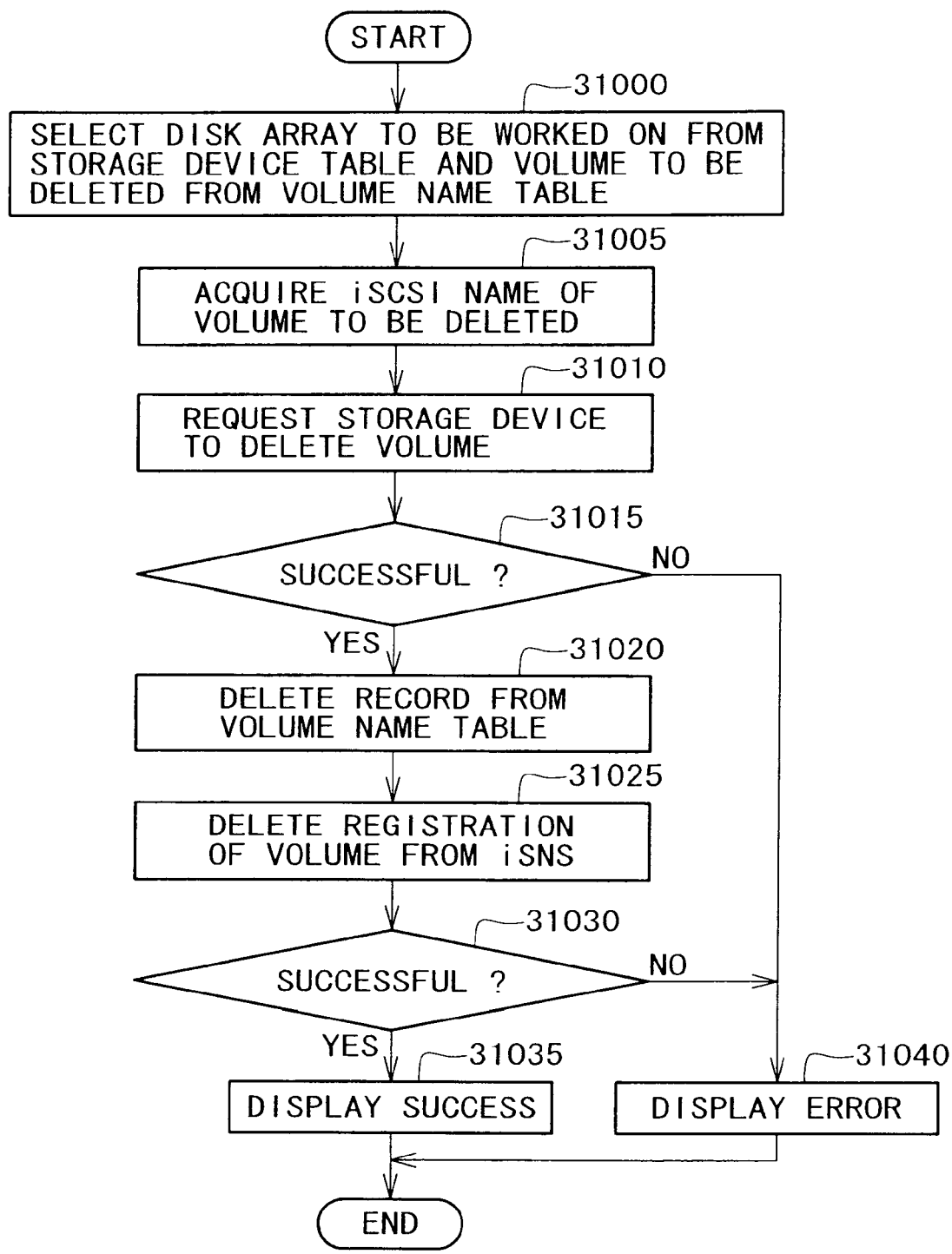
FIG. 31 is a flowchart of volume deletion processing in Embodiment 2.

Next, the operations of the management program in deleting a volume will be described with reference of the flowchart of FIG. 31.

Since it is impossible to acquire the iSCSI name of the deleted volume from the disk array 4000 after the volume 4020 is deleted, the volume table 4060 is acquired at step 31005 before its deletion, and the iSCSI name of the disk volume is acquired in advance. If the volume is successfully deleted, the record on the deleted disk volume will be deleted from the volume name table 2045 (step 31020).

At step 30025, the DevDereg message shown in FIG. 15 is created and transmitted to the iSNS server 1000.

These executions of the management program 2020 enable changes in configuration due to the creation or deletion of any disk volume to be reflected in the database 1060 of the iSNS server 1000.

(4) Creation or Deletion of LUN

Figure 32:
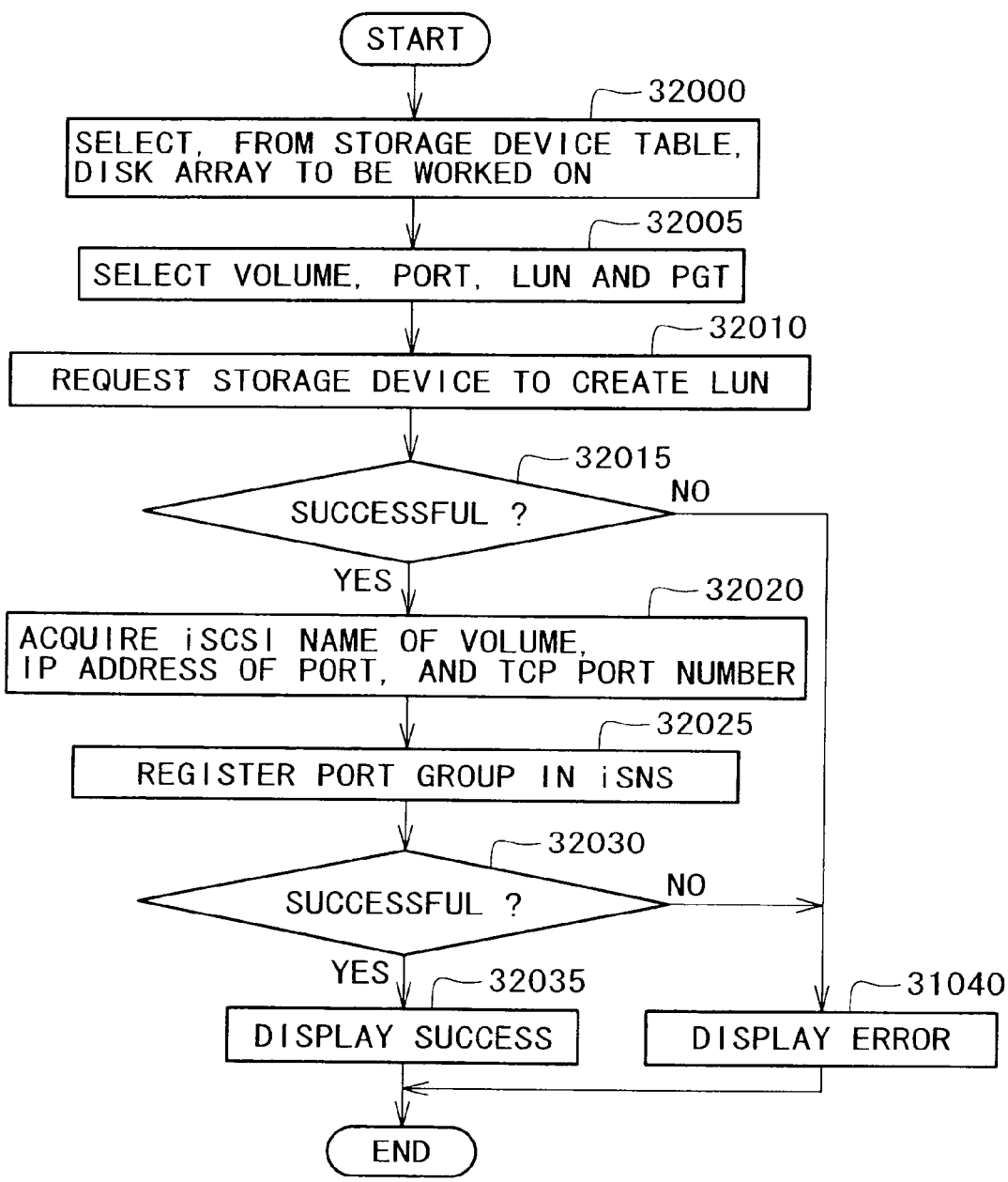
FIG. 32 is a flowchart of LUN creation processing in Embodiment 2.

The operations of the management program to create a LUN will be described below with reference to the flowchart of FIG. 32.

First, the manager manipulates the input device 2090 to select a disk volume and a port for creating a LUN from the volume name table 2045 and the port name table 2050 (step 32005). It further specifies the value and PGT of the LUN and instructs the management program 2020 to create the LUN. The management program 2020 requests the disk array 4000 to create the LUN (step 32010). Based on the determination of success or failure of LUN creation on the disk array, if the LUN creation proves successful, the volume table 4060 and the port table 4055 will be acquired from the disk array 4000, and the iSCSI name of the selected volume and the IP address and port number of the port will be acquired (step 32020). Then the DevAttrReg message shown in FIG. 17 is created and transmitted to the iSNS server 1000 (step 32025).

Figure 33:
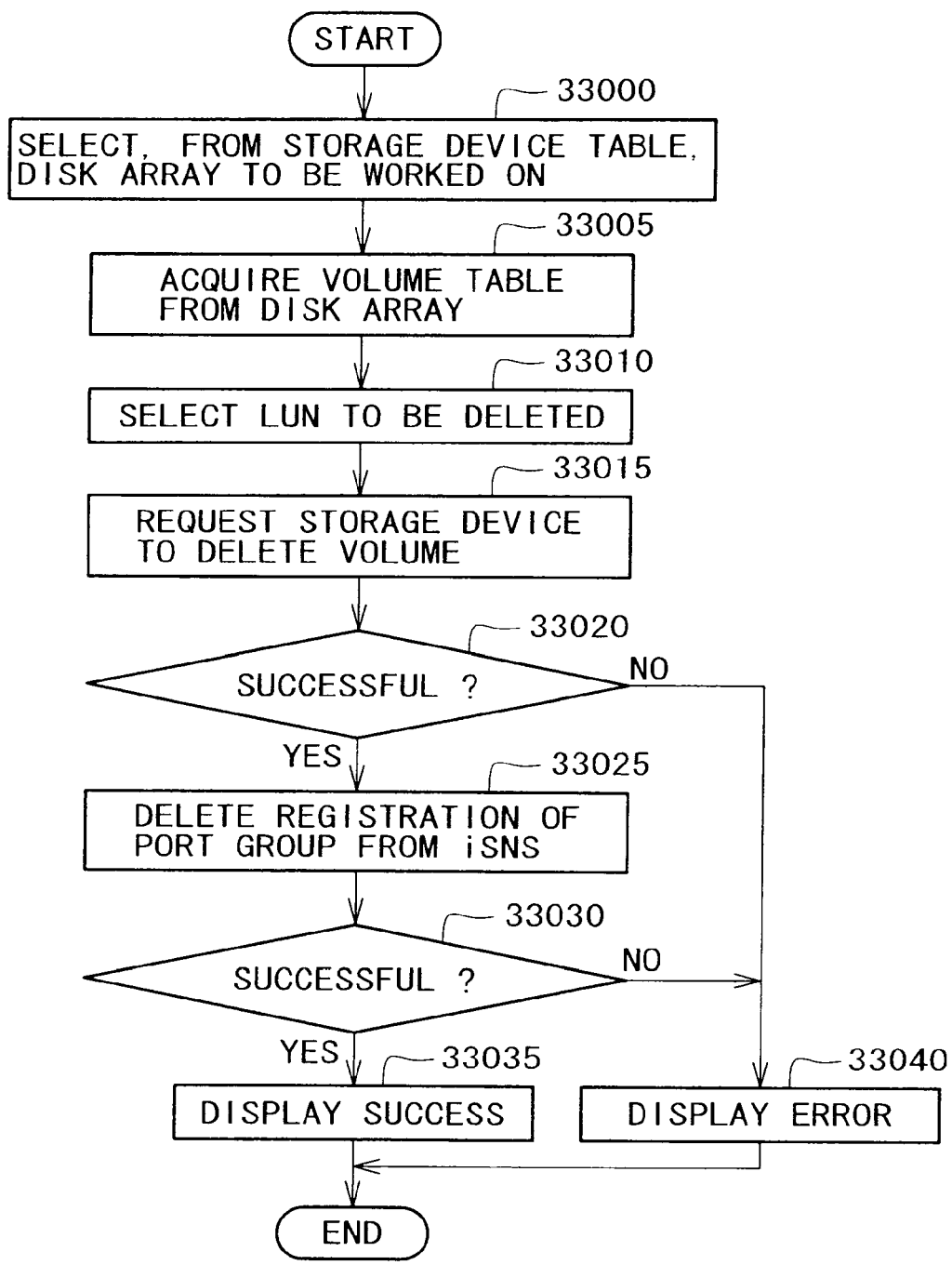
FIG. 33 is a flowchart of LUN deletion processing in Embodiment 2.

Next will be described the operations of the management program 2020 to delete a LUN with reference of the flowchart of FIG. 33.

At step 33005, the volume table 4060 is acquired from the disk array 4000. The manager manipulates the input device 2090 to select from the volume table the LUN to be deleted, and instructs the management program 2020 to delete the LUN (step 33010). If volume deletion on the disk array 4000 proves successful (step 33020), the DevAttrReg message shown in FIG. 17 will be created and transmitted to the iSNS server 1000 (step 33025). The LUN deletion processing by the iSNS server 1000 is the same as described above. These executions of the management program 2020 enable changes in configuration due to the creation or deletion of any LUN to be reflected in the database 1060 of the iSNS server 1000.

(5) Reregistration

Since in this embodiment the disk array has no iSNS client function and no response to the ESI message issued by the iSNS server is possible, reregistration is periodically made in the database 1060 of the iSNS server 1000. Unless reregistration is made, any registered item having passed the specified registration period is deleted from the database 1060. The management program 2020 processes reregistration in the background besides performing usual management processing. Executions in the background are accomplished by use of multiprocess or multithread.

Figure 34:
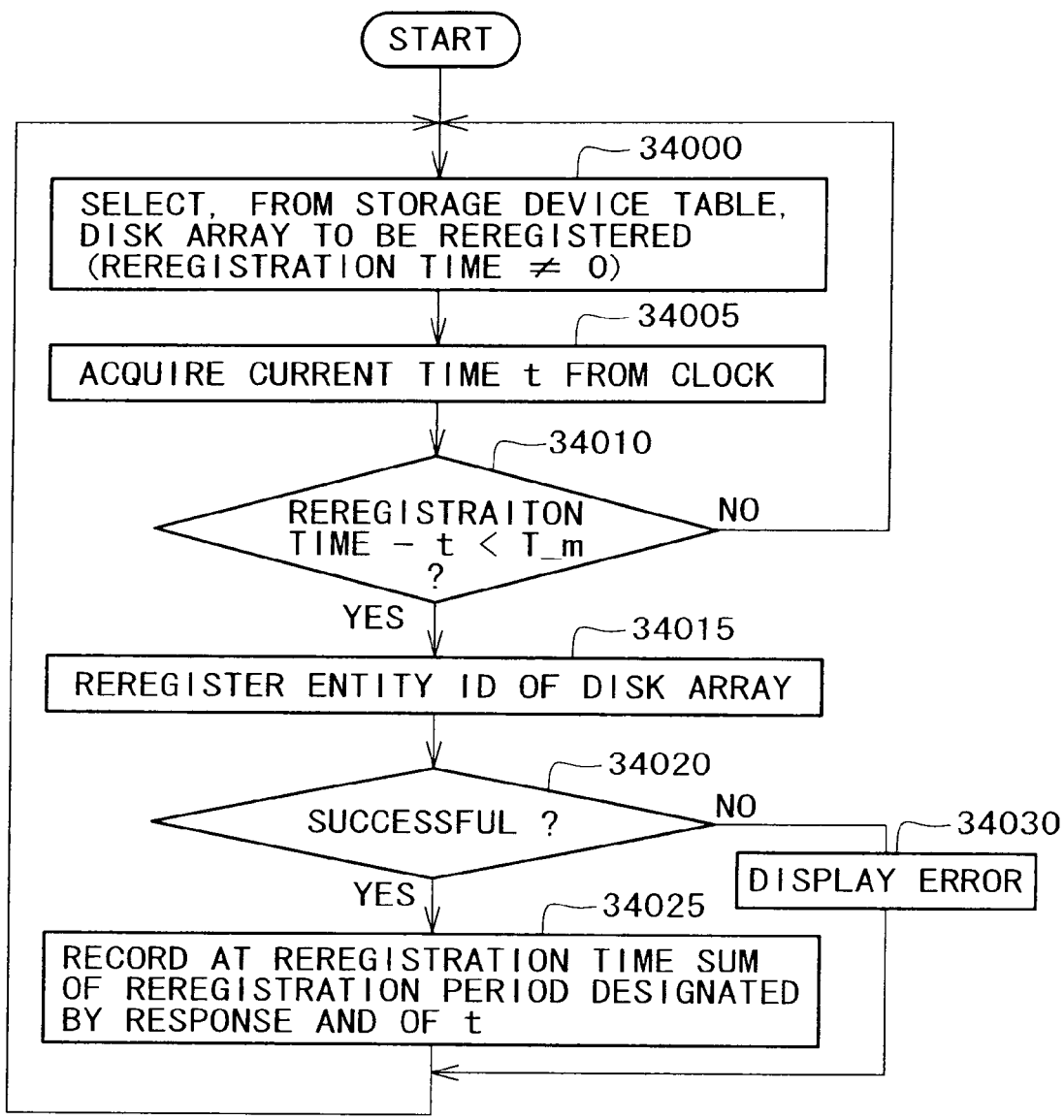
FIG. 34 is a flowchart of reregistration processing in Embodiment 2.

The operations of reregistration processing performed by the management program 2020 will now be described with reference to the flowchart of FIG. 34.

At step 34000, one device whose reregistration time is not "0" is selected from the storage device table 2025. The current time t is read from the clock (step 34005) and, if the difference between the reregistration time and t stated in the storage device table 2025 is greater than the period margin T_m (step 34010), the processing will return to step 34000 to select another device. If the difference is not greater, the DevAttr- Reg message shown in FIG. 35 will be transmitted to the iSNS server 1000, and the entity ID of the disk array will be reregistered (step 34015).

Figure 35:
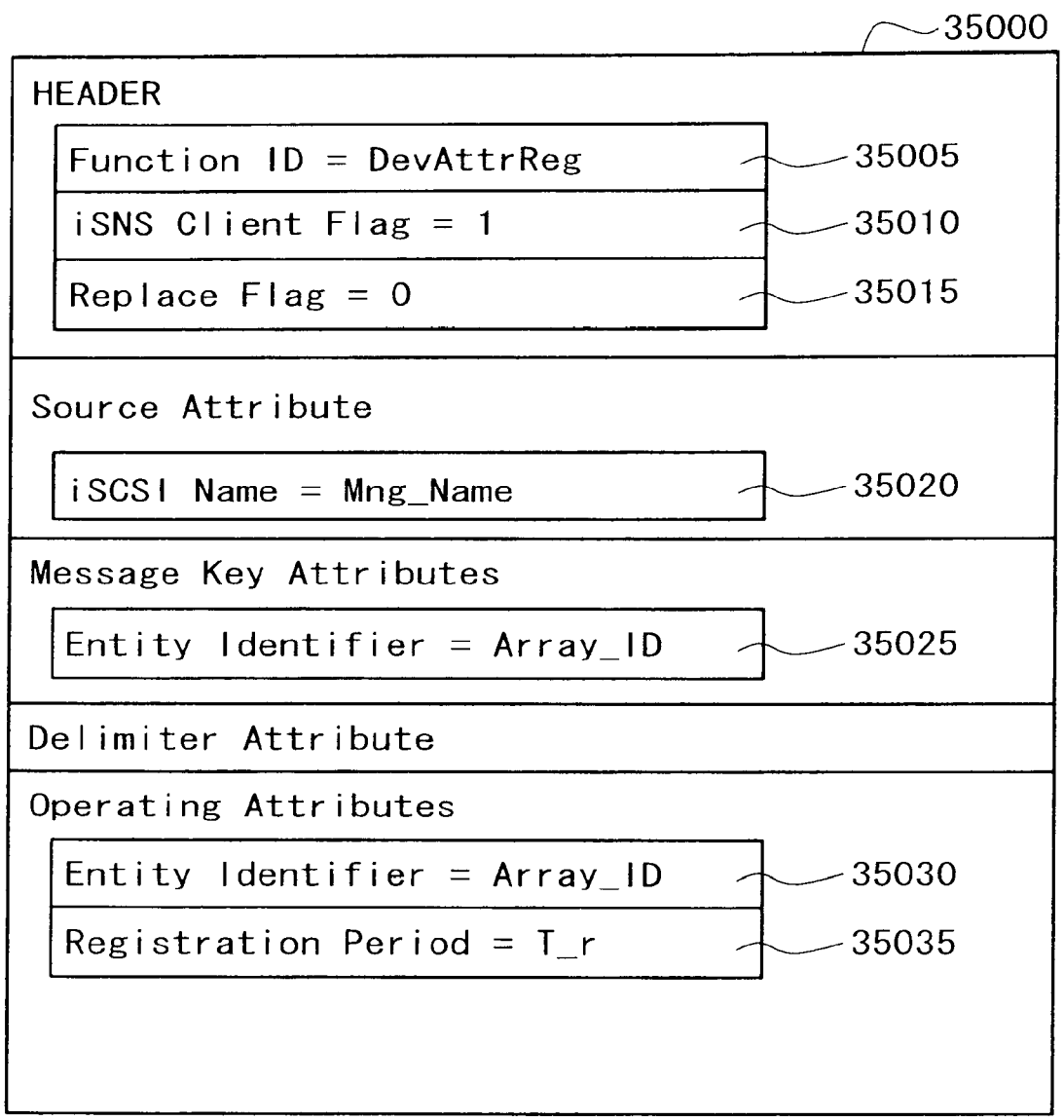
FIG. 35 shows the configuration of a message of reregistration in Embodiment 2.

Although the message shown in FIG. 35 is a message simply designating an entity ID and a reregistration period, since all the storage node belonging to the same entity can be reregistered by any single message according to the iSNS specifications, all the registered contents regarding every device can be reregistered by this processing. If the reregistration attempt proves successful (step 34020), the reregistration period designated by the DevAttrRegRsp message sent as a response from the iSNS server 1000 augmented with the time acquired at step 34005 will be recorded as the reregistration time in the storage device table 2025 (step 34025), and the processing will return to step 34000. If the reregistration attempt proves unsuccessful, an error message will be displayed (step 34030), and the processing will return to step 34000.

Information is periodically reregistered by these operations executed by the management program 2020, and the registered contents can be thereby maintained so that they may not be deleted by the iSNS server program 1020 as being outdated.

In this embodiment, even where the disk array controller program of the disk array 4000 has no iSNS client function, the database of the iSNS server 1000 can be updated. Further, names assigned to disk volumes or ports by the management program 2020 of the management server 2000 can be registered in the database of the iSNS server 1000 as iSCSI aliases or port symbolic names.

Embodiment 3

This embodiment is an example of application to an environment in which the iSCSI device is managed by use of an SLP instead of an iSNS. In this embodiment, a disk volume accessed by the iSCSI Protocol is registered as a service in the directory agent (DA) of the SLP. Incidentally, the method by which the SLP is used for discovering the iSCSI device is supposed to follow already proposed specifications, whose details will not be described herein. The following description will mainly focus on differences from Embodiment 2.
(1) Configurations of SLP Directory Agent Server and Management Server In this embodiment, the directory agent server of the SLP (SLP DA) will be used instead of the iSNS server. Therefore, the management program has a user agent function of the SLP instead of the iSNS client function and an SLP DA address instead of the iSNS address 2035. Under management using the SLP, combinations of disk volume and port are registered as services, but not as isolated port objects. Therefore, the management server in this embodiment, unlike that in Embodiment 2, does not have the port name table 2050.

Figures 36, 37:
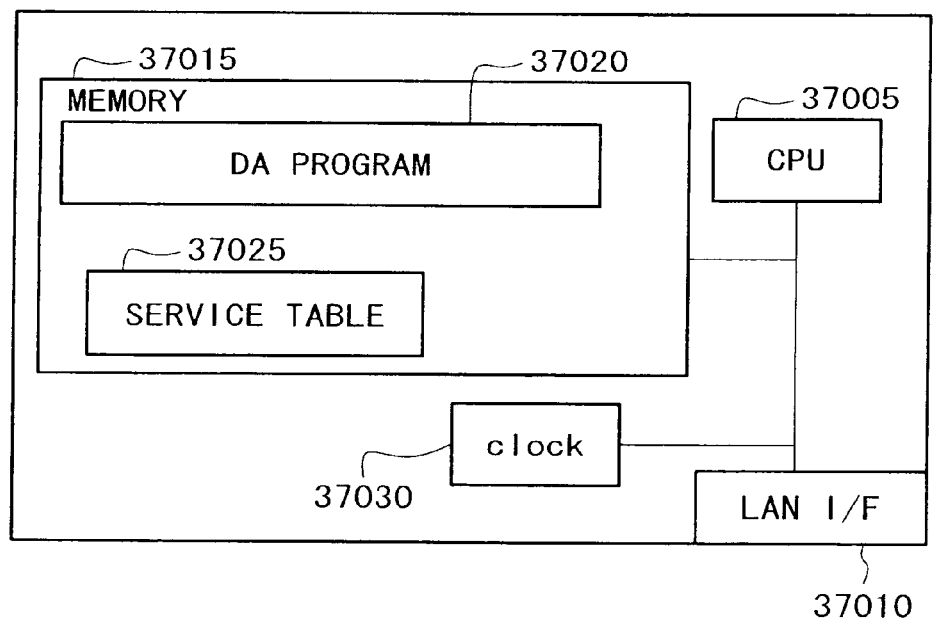
FIG. 36 shows the configuration of are registration table in Embodiment 3.
FIG. 37 shows the configuration of an SLP Directory Agent server in Embodiment 3.

FIG. 37 shows the configuration of an SLP DA server 37000.

This SLP DA server 37000 is connected to the network via a LAN interface 37010. In a memory 37015 is stored a DA program 37020 which provides a service table 37025, which is the database of services within the network, and the functions of the DA. A CPU 37005 executes the DA program.

The service table 37025 has a configuration shown in FIG. 38.

Referring to FIG. 38, column 3702500 of URLs record the URLs of registered services. In an iSCSI device, a URL includes the IP address and port number of the portal and the iSCSI name according to the proposed specifications. In column 3702505 of service types is recorded service:iscsi:target in the case of a disk volume accessed by the iSCSI Protocol. In column 3702510 of a scope list are recorded one or more scopes to which services belong. In column 3702515 of lifetime is recorded the duration of registration of each service. The DA program reads the current time from a clock 37030 to check whether or not the lifetime of a given service has expired and, if expired, deletes the service. Column 3702520 of attributes and column 3702525 of attribute values respectively record the combination of the attribute and its value of each service.

Figure 39:
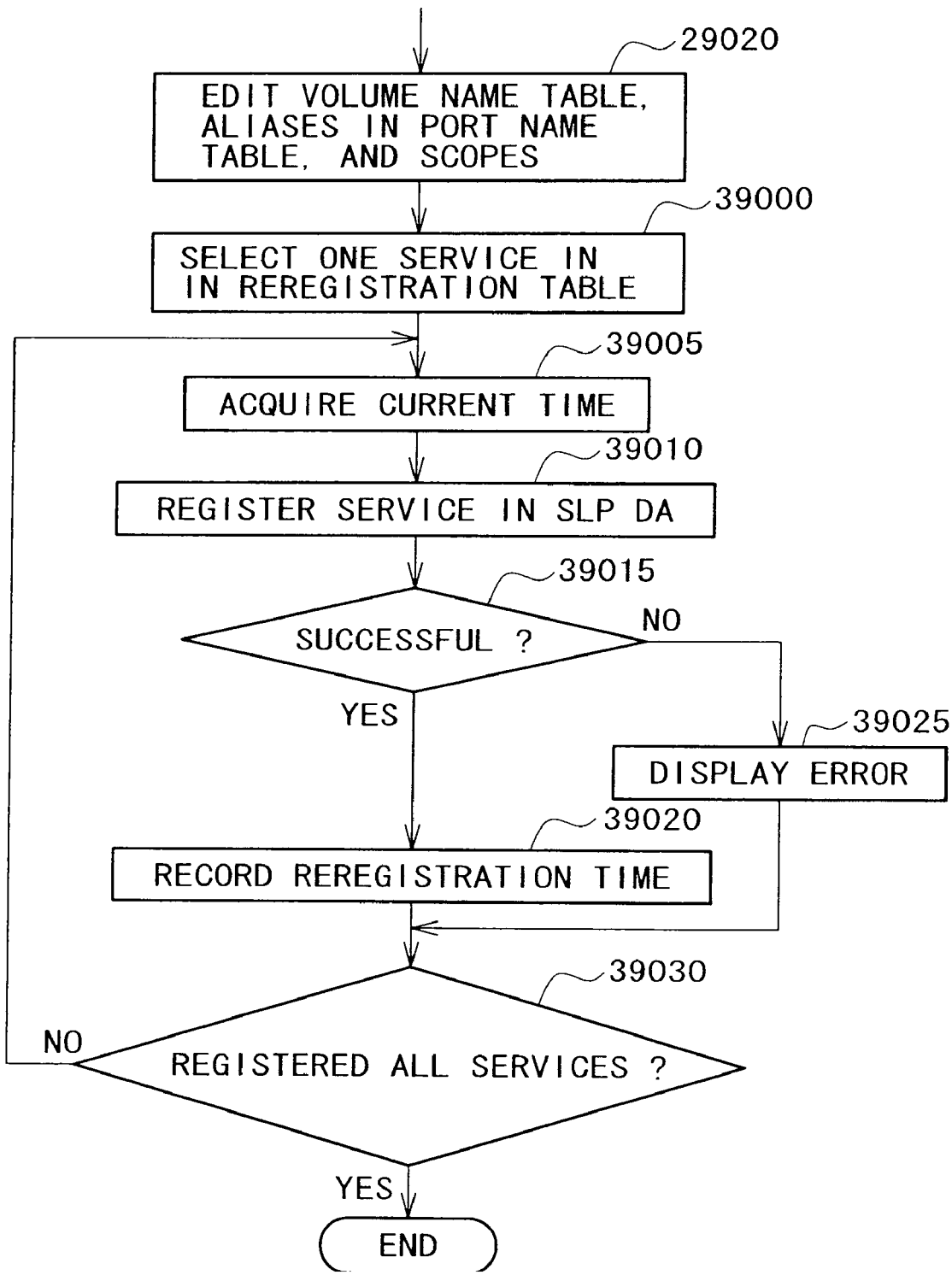
FIG. 39 is a flowchart of initial registration processing in Embodiment 3.
Figure 40:
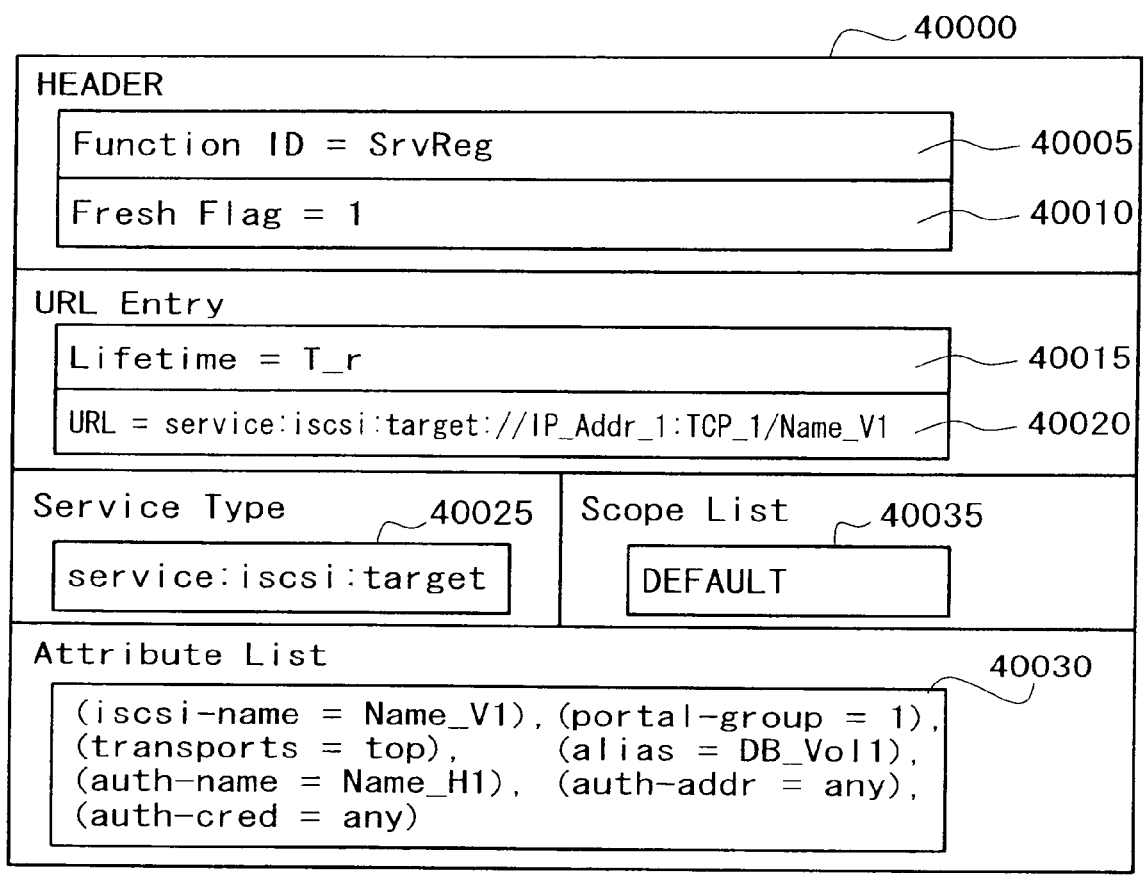
FIG. 40 shows the configuration of a message of initial registration in Embodiment 3.

The storage device table of the management server has the same configuration as what is shown in FIG. 2. Further, the memory has within it a reregistration table shown in FIG. 36. Referring to FIG. 36, column 3602500 of URLs, column 3602505 of scopes, column 3602515 of attributes and column 3602520 of attribute values respectively record the same values regarding the services in the rows having the same names in FIG. 37. Column 3602510 of reregistration times record the next reregistration of each service. No service whose reregistration time "0" is reregistered.
(2) Initial Registration The operations of the management program for initial registration in this embodiment are substantially similar to those for Embodiment 2 shown in FIG. 29. The following description will mainly focus on points of difference with reference to the flowchart of FIG. 39. At step 100005 in FIG. 29, each of the LUNs recorded in the acquired volume table is recorded in the reregistration table as a service in addition to recording in the storage device table and the volume name table. Matching relationships between items recorded in the volume table and those to be recorded in the reregistration table will be described afterwards. In the reregistration time column of the reregistration table is recorded "0". At step 29020 in FIG. 39, in addition to names in the volume name table, the list of scopes for the reregistration table is also edited. DEFAULT is stated as the value in an unedited scope list. At step 39000, one of the services recorded in the reregistration table is selected, and the current time is read out of the clock (step 39005); at step 39010 the service registration (SrvReg) message shown in FIG. 40 is created and transmitted to SLP DA.

As the header of a SrvReg message 40000 is designated a function ID 40005 representing the SrvReg message, and a fresh flag indicating deletion of previous registration regarding this service is set. In the URL Entry part, a reregistration period T_r is designated for a lifetime 40015, and a URL recorded in the reregistration table for a URL 40020. URLs in the reregistration table are defined for each LUN of the disk volumes recorded in the acquired volume table; the IP address and port number of the port for which the LUN is linked by a colon to follow service:iscsi:target://; and the iSCSI name of the disk volume is designated to follow /. As the service type 40025 is designated service:iscsi:target; as the scope list 40035 is designated the value of the scope list in the reregistration table; and as the attribute list 40030 are designated attributes stated in the service template of the iSCSI target device. As attributes including the iscsi-name, auth-name and portal-group, the combinations of attribute and attribute value in the respective reregistration tables are designated, and matched with the values of the iSCSI name, allocated host and PGT of the disk volume of each LU recorded in the respective volume tables. As transports is designated tcp. As auth-cred and auth-addr is designated any. As alias is designated the name to be recorded in the volume name table. Since the form of the attribute list is to conform to the specifications of the method of discovery of iSCSI devices by SLP, detailed description will be dispensed with.

If the registration attempt proves successful (step 39015), the time acquired at step 39005 augmented with the reregistration period T_r is recorded in column 3602510 of reregistration times in the reregistration table (step 39020). If unsuccessful, an error message will be displayed (step 39025) The processing from step 39005 through step 39025 is repeated for all the services recorded in the reregistration table (step 39030).

By the procedure described above, information on the configuration of any disk array to be added as the object of registration can be reflected in the database held by the SLP DA server 37000. Incidentally, the operations of the SLP DA program are supposed to conform to the specifications of SLP, and their description is dispensed with.

(3) Creation and Deletion of LUN

Since only accessible disk volumes to which ports are allocated are registered as services in management using SLP, no processing for registration in SLP arises with respect to volume creation and deletion, and only the internal configuration of the disk array is altered as usual.

The operations of the management program when a LUN is to be created will be described with reference to the flowchart of FIG. 41.

At step 41005, the volume table 4060 and the port table 4055 are acquired from the disk array 4000. The manager selects the volume and port for LUN creation, then specifies the values and scopes of the LUN and PGT, and instructs the management program to create the LUN. If the attempt to create the LUN fails (step 41010), an error message will be displayed on the output device and the processing will be ended (step 41045).

If the LUN creating attempt proves successful, the current time will be acquired from the clock (step 41020), create the SrvReg message shown in FIG. 40, and transmit it to SLP DA. In this case, unlike in initial registration, no fresh flag 40010 is set, and as the auth-name attribute is designated any. If the registration attempt proves successful (step 41030), the registered attribute will be recorded in the reregistration table. Also, as in the processing of initial registration, the reregistration time is recorded, a success message is displayed, and the processing is ended (step 41035).

Figure 43:
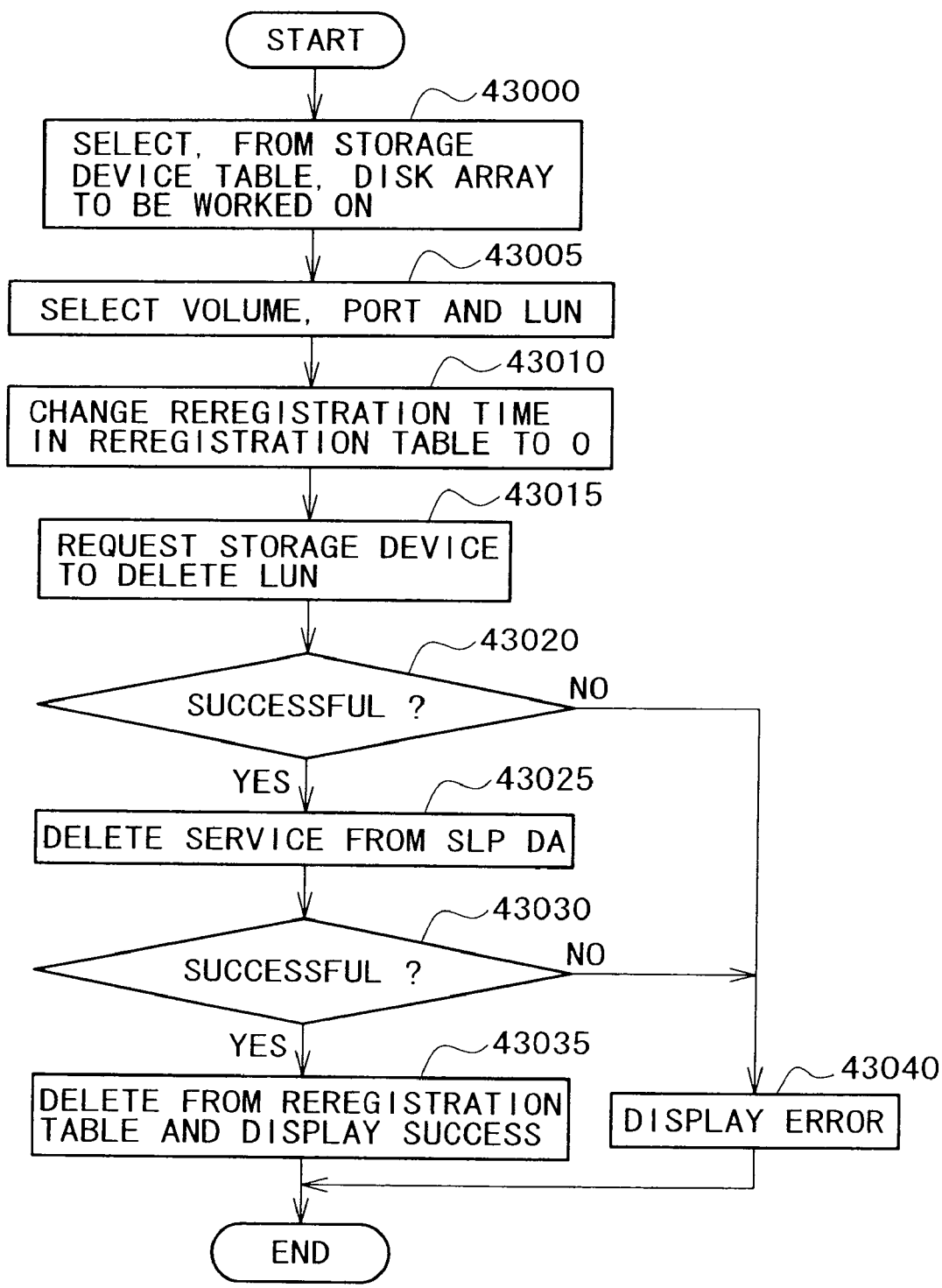
FIG. 43 is a flowchart of LUN deletion processing in Embodiment 3.

The operations of the management program when a LUN is to be deleted will be described below with reference to the flowchart of FIG. 43.

At step 43005, the volume table 4060 is acquired from the disk array 4000. The manager selects the disk volume, port and LUN of the LUN to be deleted by manipulating the input device, and instructs the management program to delete the LUN. Next, reregistration during the processing is prevented by setting to "0" the reregistration time of the service in the reregistration table corresponding to the selected LUN (step 43010). If the attempt to delete the LUN fails (step 43020), an error message will be displayed on the output device and the processing will be ended (step 43040).

If the attempt proves successful, the service deregistration (SrvDereg) message shown in FIG. 42 will be created and transmitted to SLP DA (step 43025). Referring to FIG. 42, as a scope list 42010 are designated the values recorded in the scope list in the reregistration table. As the URL 42015 in the URL Entry part, the value recorded as the URL in the reregistration table is designated. In the Tag List 42020, "0" is designated as the attribute length, and no attribute is designated. If the deletion attempt proves successful (step 41030), the pertinent record will be deleted from the reregistration table, a success message displayed, and the processing ended (step 41035).

These operations of the management program enable any change in configuration due to LUN creation or deletion to be reflected in the database of the SLP DA server.

(4) Addition and Deletion of Setting of LUN Masking

Under management using the SLP, unlike in discovery domains of the iSNS, a list of the iSCSI names of accessible host computers is recorded as the auth-name attributes of services. Therefore, when the setting of LUN masking has been altered, the auth-name attribute of the service representing the pertinent disk volume has to be altered.

The operations of the management program in additional setting of LUN masking will be described with reference to the flowchart of FIG. 44.

At step 44005, a volume table is acquired from the disk array, and the manager selects the volume, port and LUN for which LUN masking is to be set. The manager also designates the iSCSI name of the host computer to be allocated, and instructs the management program to additionally set LUN masking (step 44010). The management program requests the disk array to set the designated LUN masking (step 44015) and, if the setting attempt fails (step 44020), an error message will be displayed on the output device and the processing will be ended (step 44045).

If successful, the iSCSI name of the host computer designated for the attribute value of the auth-name attribute of the reregistration table will be added (step 44025), and the SrvReg message shown in FIG. 40 will be transmitted to SLP DA. However, the fresh flag 40010 is not set. The auth-name attribute in the Attribute List 40030 part is designated a value recorded as one of the attribute values of the auth-name in the reregistration table also including the iSCSI name of the additional host computer. If the registration attempt proves successful, a success message will be displayed and the processing will be ended (step 44040).

Figure 45:
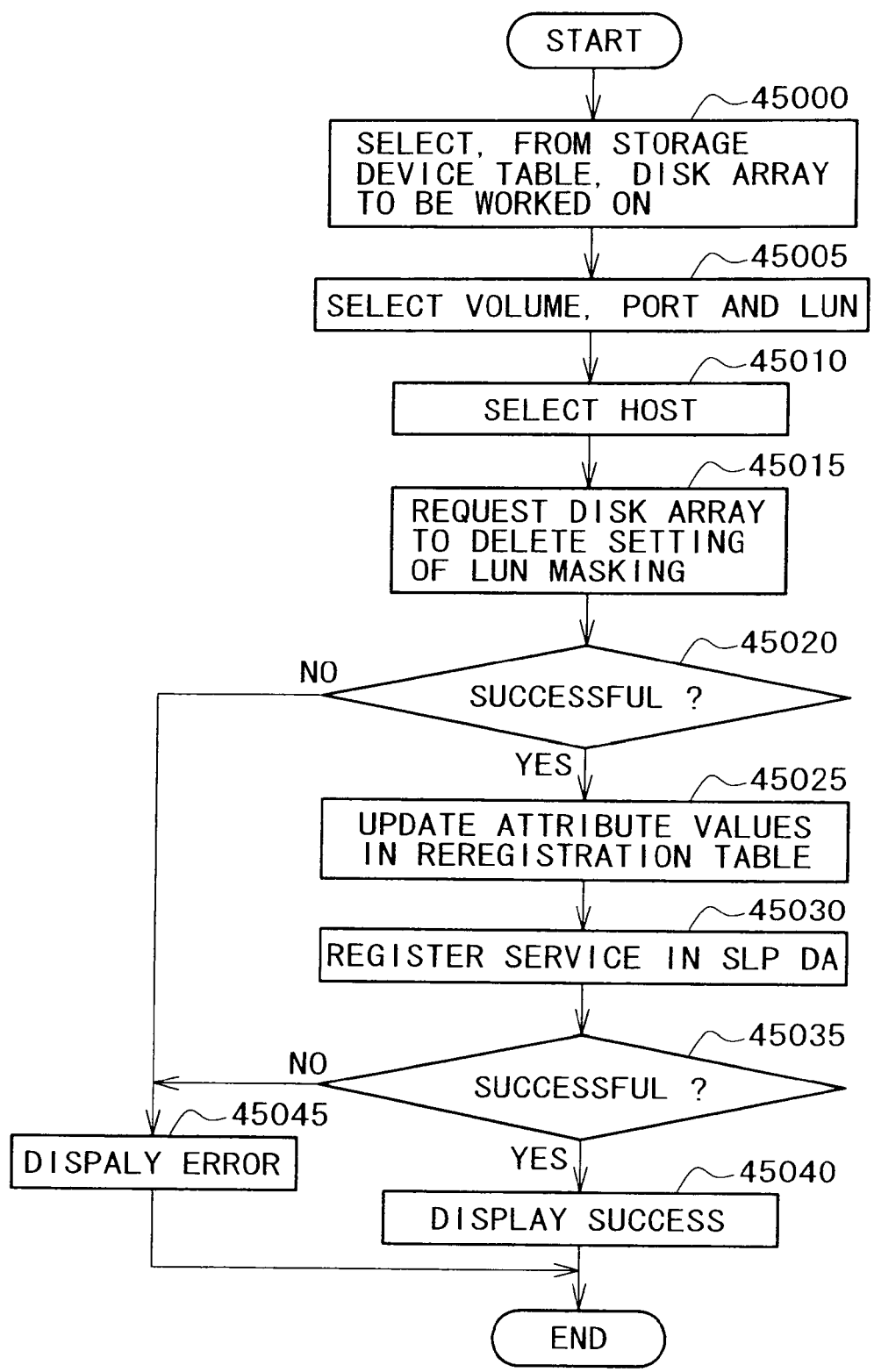
FIG. 45 is a flowchart of processing to delete the setting of LUN masking in Embodiment 3.

Next, the operations of the management program in deleting the setting of LUN masking will be described with reference to the flowchart of FIG. 45.

Figure 44:
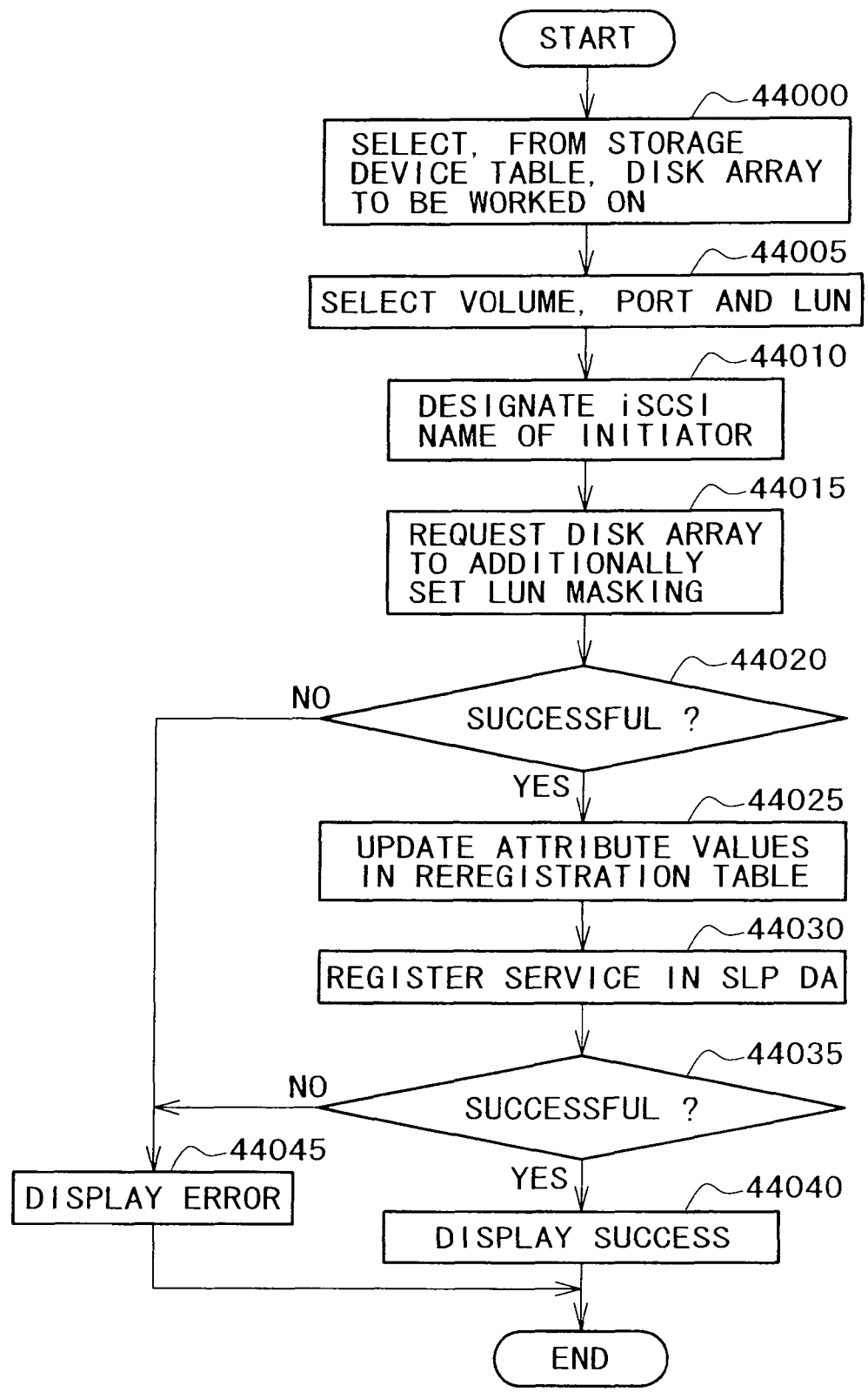
FIG. 44 is a flowchart of processing the additional setting of LUN masking in Embodiment 3.

As in the additional setting of LUN masking charted in FIG. 44, at step 45010, an iSCSI name is selected from auth-name attributes in the reregistration table instead of designating the iSCSI name of the host computer. At step 45025, the selected iSCSI name is deleted from the attribute values of the auth-name attributes. These operations of the management program enable any change in configuration due to the addition or deletion of the setting of LUN masking to be reflected in the database of the SLP DA server.

(5) Reregistration

The DA program deletes the registration of any service whose lifetime has expired or reregisters it before expiration if the registered contents are to be retained.

Figure 46:
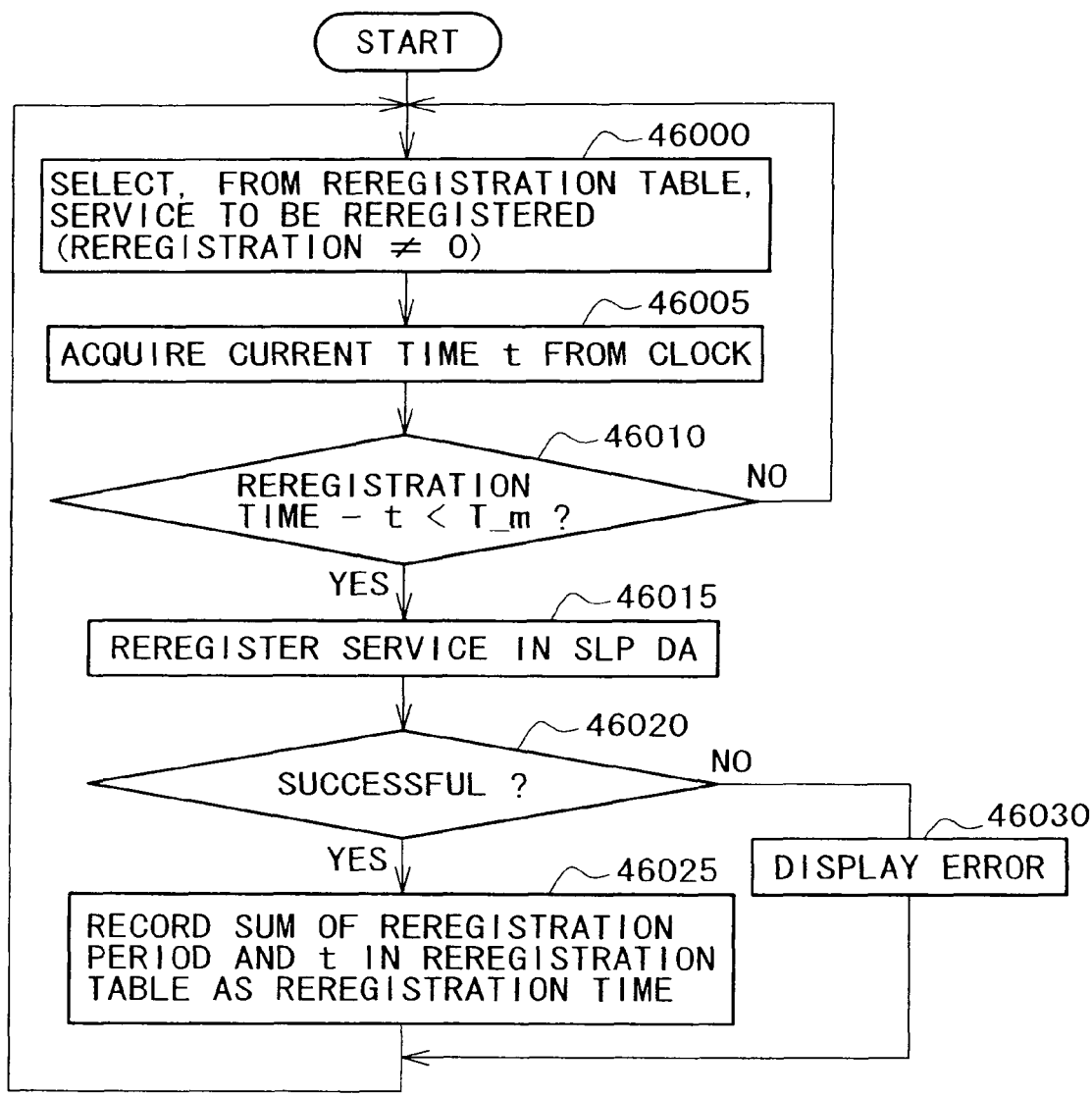
FIG. 46 is a flowchart of reregistration processing in Embodiment 3.

The operations of reregistration processing performed by the management program will be described below with reference to the flowchart of FIG. 46.

At step 46000, one service whose reregistration time is not "0" is selected from the reregistration table. The current time t is acquired from the clock (step 46005), and it is checked whether or not the reregistration time t recorded in the reregistration table is shorter than the period margin T_m (step 46010). If it is longer, the processing will return to step 46000 to select another service. If it is shorter, the SrvReg message shown in FIG. 40 will be created from the contents recorded in the reregistration table and transmitted to SLP DA (step 46015). If the registration attempt fails (step 46020), an error message will be displayed (step 46030), and the processing will return to step 46000. If successful, the time acquired at step 46005 augmented with T_r will be recorded in the reregistration time of the reregistration table, and the processing will return to step 46000 (step 46025).

These executions of the management program enable information to be periodically reregistered in the database of the SLP DA server and thereby to maintain the registered contents.

This Embodiment 3, in an environment in which the iSCSI device is to be discovered by use of the SLP, enables changes in the configuration of any storage device resulting from the creation or deletion of any volume or the creation or deletion of any LUN to be reflected in registration in the database held by the SLP DA server. Also, interlocked with configurational changes due to the creation or deletion of LUN masking, it enables the auth-name attribute of a service representing a disk volume to be updated.

Embodiment 4

This embodiment represents an example in an environment in which storage devices to be managed, described with reference to Embodiment 1 and Embodiment 2, are in mixed existence. Thus, the embodiment is a system in which both a disk array having the iSNS client function and a disk array having no such function are present in mixture.

The management program 2020 determines whether or not the disk array 4000 to be worked on has the iSNS client function, selects either the management method of Embodiment 1 or the management method of Embodiment 2, and executes processing on it. The following description will mainly focus on differences from Embodiment 2.

(1) Configurations of Disk Array and Storage Device Table

Though only one disk array 4000 is shown in FIG. 1, in this Embodiment 4 it is supposed that a disk array having the iSNS client function and another disk array having no such function are connected to the LAN switch 3010 in any desired way. Incidentally, both disk arrays are referred to by a sign 4000.

Figures 47, 48:
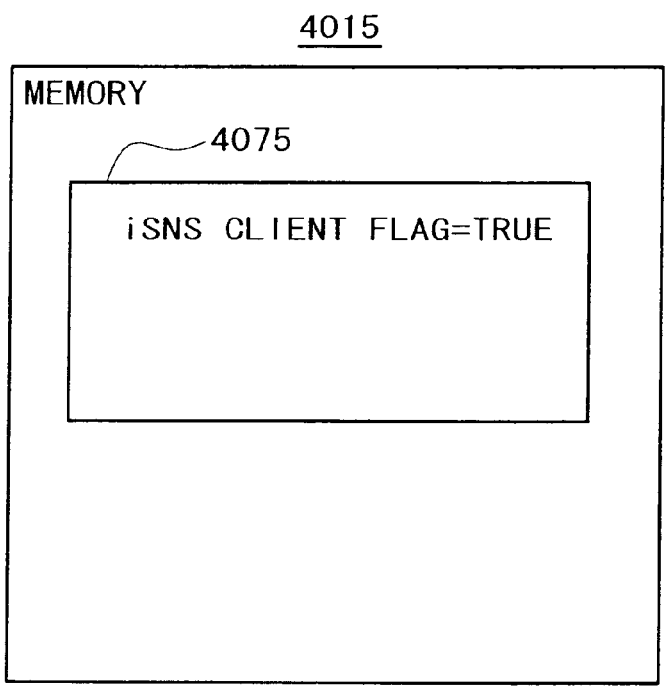
FIG. 47 shows the configuration of a memory 4015 in Embodiment 4.
FIG. 48 shows the configuration of a storage device table 2025 in Embodiment 4.

In this embodiment, the disk array 4000 to be managed has in its memory 4015 an iSNS client flag 4075 as shown in FIG. 47 in addition to the constituent elements 4045 through 4070 shown in FIG. 1. The flag has a value of "TRUE" or "FALSE", TRUE indicating that the disk array 4000 has the iSNS client function and FALSE indicating the absence of that function.

Further as shown in FIG. 48, the storage device table 2025 of the management server 2000, unlike the storage device table shown in FIG. 26, is assigned column 202520 of the iSNS client flag for recording the value of the iSNS client flag of each device.

(2) Initial Registration

Figure 49:
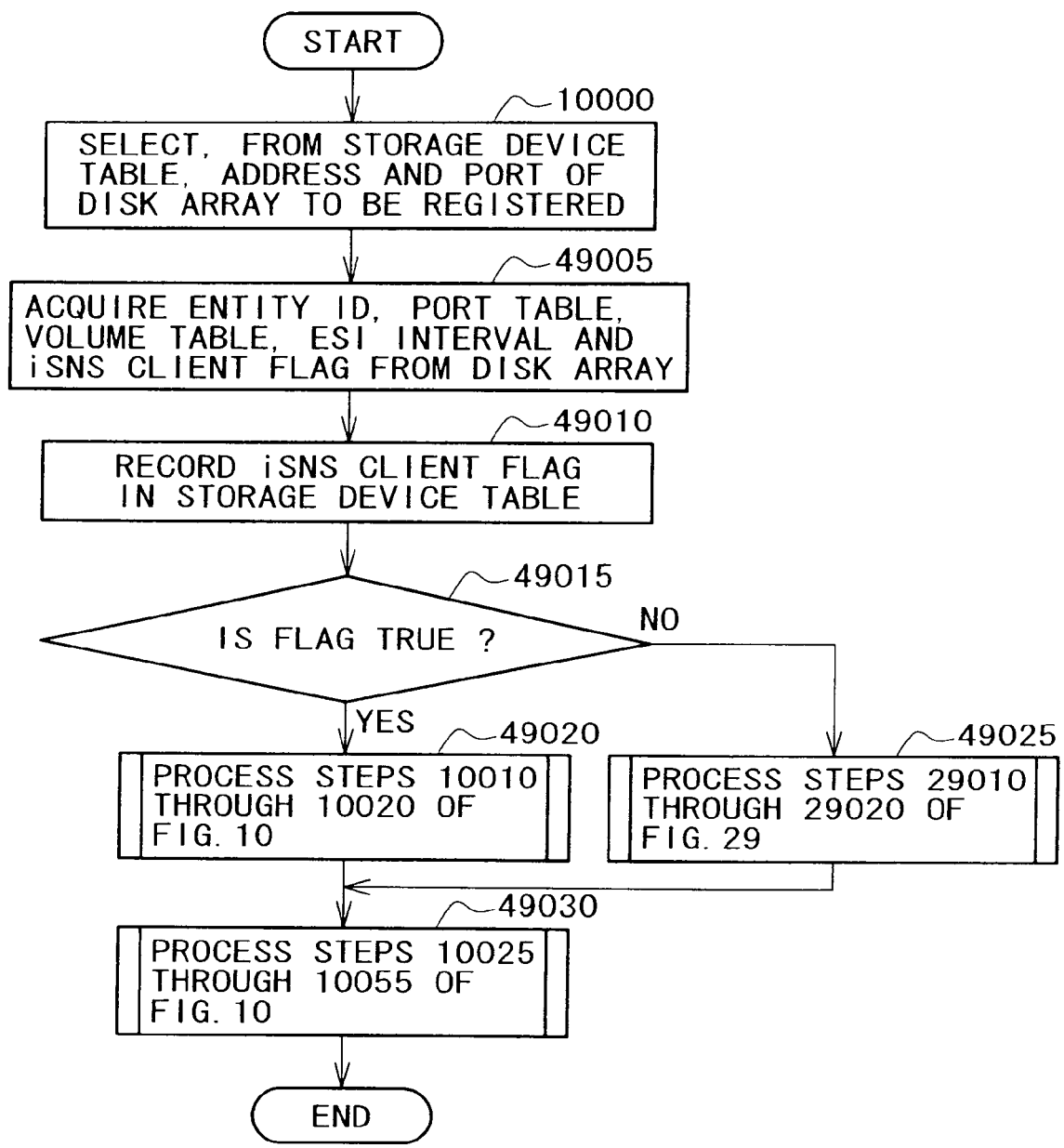
FIG. 49 is a flowchart of initial registration processing in Embodiment 4.

The operations of the management program 2020 in initial registration will be described below with reference to the flowchart of FIG. 49.

Unlike at step 10005 for Embodiment 1 and 2 (FIG. 10 and FIG. 29, respectively), at step 49005 the management program 2020 also acquires the value of the iSNS client flag from the disk array 4000. Then it records this iSNS client flag in the storage device table 2025 (step 49010). Next, it assesses the value of this flag and determines whether or not the disk array 4000 to be managed has the iSNS client function (step 49015).

If the value of the flag is "TRUE", namely if the disk array has the iSNS client function, processing for Embodiment 1 (steps 10010 through 10020 in FIG. 10) will be performed (step 49020). Of if the value of the flag is "FALSE", namely if the disk array has no iSNS client function, processing for Embodiment 2 (steps 29010 through 29020 in FIG. 29) will be performed (step 49025). After that, steps of processing common to Embodiments 1 and 2 (steps 10025 through 10055 in FIG. 10) will be performed (step 49030).

(3) Change-Over of Contents of Processing

The operations of the management program 2020 in creating or deleting a volume or a LUN will now be described with reference to the flowchart of FIG. 50.

When the disk array 4000 to be worked on is selected at step 50000, it is determined whether or not the selected disk array 4000 has the iSNS client function (step 50005). If the determination indicates that the flag is "TRUE", namely if the disk array has the iSNS client function, processing described with respect to Embodiment 1 (steps 16005 through 16030 in FIG. 16) will be performed (step 50010).

Or if the flag is "FALSE", namely if the disk array has no iSNS client function, processing described with respect to Embodiment 2 will be performed (step 50015). To describe the specific contents of processing, where a volume is to be created, steps 30005 through 30050 in FIG. 30, where a volume is to be deleted, steps 31005 through 31040 in FIG. 31, where a LUN is to be created, steps 32005 through 32040 in FIG. 32, or where a LUN where a volume is to be deleted, steps 33005 through 33040 in FIG. 33 will be processed.

(4) Reregistration

In this embodiment, the reregistration processing described with respect to Embodiment 2 is applied to the disk array having no iSNS client function. For this reason, step 34000 shown in FIG. 34 is replaced by step 51000 shown in FIG. 51, and only a device whose iSNS client flag is FALSE is selected from the storage device table.

This Embodiment 4, in an environment in which a disk array having the iSNS client function and a disk array having no such function are present in mixture, enables changes in the configuration of any storage device resulting from the creation or deletion of any volume or the creation or deletion of any LUN to be reflected in registration in the iSNS database.

Since the various embodiments so far described, as their storage device configurations are altered, enable information on those configurational changes to be reflected in information service devices including the iSNS server and the SLP, it is made possible to promptly provide that information to the network. Furthermore, since information registered in information service devices including the database of the SNS server or the SLP according to configuration changes in storage devices is updated, it is made possible to discover a volume from the host computer.

What is claimed is:

1. A system coupled to a host computer, comprising:
a storage system having ports and storage areas;
an information service device having a database storing relationship between the ports and storage areas,
wherein if configuration of the storage areas is changed, the storage system sends configuration information of the storage areas to the information service device, and
wherein the information service device modifies the relationship based on the configuration information sent from the storage system so that the relationship is synchronized to the configuration of the storage areas.

2. The system according to claim 1,
wherein the database is configured as an SLP (Service Location Protocol) Directory Agent.

3. The system according to claim 1,
wherein the information service device is an iSNS (Internet Storage Name Server).

4. The system according to claim 1, wherein the host computer sends a command to the information service device, and wherein the information service device sends information storage areas which are permitted to be accessed from the host computer based on the database in response to receiving the command.

5. The system according to claim 1, wherein when a first storage area is added to the storage areas as a change of the configuration of the storage areas, the storage system sends configuration information including information related to the first storage area to the information service device, and wherein the information service device modifies the database so that the database includes a relationship related to the first storage area based on the configuration information.

6. The system according to claim 1, wherein when a first storage area is deleted from the storage areas as a change of the configuration of the storage areas, the storage system sends configuration information not including information related to the first storage area to the information service device, and wherein the information service device modifies the database to delete relationship related to the first storage area based on the configuration information.

* * * * *